(12) United States Patent
Caudill et al.

(10) Patent No.: US 11,925,294 B2
(45) Date of Patent: Mar. 12, 2024

(54) COOKING SYSTEMS WITH WASHING ELEMENTS AND SPREADER BAR

(71) Applicant: Henny Penny Corporation, Eaton, OH (US)

(72) Inventors: Randy Caudill, Hamilton, OH (US); Mark Gogel, Richmond, IN (US)

(73) Assignee: Henny Penny Corporation, Eaton, OH (US)

( * ) Notice: Subject to any disclaimer, the term of this patent is extended or adjusted under 35 U.S.C. 154(b) by 723 days.

(21) Appl. No.: 17/016,605

(22) Filed: Sep. 10, 2020

(65) Prior Publication Data
US 2020/0405098 A1 Dec. 31, 2020

Related U.S. Application Data

(62) Division of application No. 16/082,086, filed as application No. PCT/US2017/022866 on Mar. 17, 2017, now Pat. No. 10,799,068.
(Continued)

(51) Int. Cl.
*A47J 37/12* (2006.01)
*B08B 9/093* (2006.01)

(52) U.S. Cl.
CPC ....... *A47J 37/1266* (2013.01); *A47J 37/1223* (2013.01); *A47J 37/1238* (2013.01);
(Continued)

(58) Field of Classification Search
CPC ............... A47J 37/1238; A47J 37/1271; A47J 37/1276; A47J 37/1285; A47J 37/1261
See application file for complete search history.

(56) References Cited

U.S. PATENT DOCUMENTS 3,217,633 A 11/1965 Anetsberger
3,667,374 A 6/1972 Holmes
(Continued)

FOREIGN PATENT DOCUMENTS

CN 1449869 A 10/2003
CN 2822778 Y 10/2006
(Continued)

OTHER PUBLICATIONS

China National Intellectual Property Administration, First Office Action and Search Report issued in CN 201780023909.0 dated Feb. 2, 2021 with partial English Translations (12 pages).
(Continued)

*Primary Examiner* — Reginald Alexander
(74) *Attorney, Agent, or Firm* — Wood Herron & Evans LLP

(57) ABSTRACT

Systems are disclosed for cleaning a fryer using a washing element coupled to a bottom wall of a cooking chamber. An upper portion of the washing element extends above the bottom wall of the cooking chamber and includes a plurality of spray jet nozzles that are separated at predetermined angles relative to one another around a periphery of the upper portion of the washing element to orient the plurality of spray jet nozzles so as to spray a plurality of pressurized streams of the cooking medium to predetermined areas of the cooking chamber, including at least one corner of the cooking chamber. Also disclosed is a fryer that includes a spreader bar that maintains an electric heating coil in the serpentine pattern. The spreader bar is coupled to the upper surface of the electric heating coil and is disposed at a predetermined distance away from the bottom wall.

26 Claims, 19 Drawing Sheets

Related U.S. Application Data

(60) Provisional application No. 62/309,650, filed on Mar. 17, 2016.

(52) U.S. Cl.
CPC ....... *A47J 37/1247* (2013.01); *A47J 37/1261* (2013.01); *A47J 37/1271* (2013.01); *A47J 37/1276* (2013.01); *A47J 37/1285* (2013.01); *B08B 9/093* (2013.01); *B08B 2209/08* (2013.01)

(56) References Cited

U.S. PATENT DOCUMENTS

| | | | |
|---|---|---|---|
| 3,716,192 A * | 2/1973 | Hunter | B05B 1/14 |
| | | | 239/205 |
| 3,735,693 A | 5/1973 | Pelster et al. | |
| 4,058,703 A | 11/1977 | Price | |
| 4,064,796 A | 12/1977 | Jones | |
| 4,166,138 A | 8/1979 | Ziminski et al. | |
| 4,397,299 A | 8/1983 | Taylor et al. | |
| 4,420,006 A | 12/1983 | Moore et al. | |
| 4,502,373 A | 3/1985 | Keating | |
| 4,769,249 A | 9/1988 | Webb | |
| 4,848,318 A | 7/1989 | Brewer | |
| 5,244,370 A | 9/1993 | DeMars | |
| 5,301,847 A | 4/1994 | Fehr et al. | |
| 5,611,330 A | 3/1997 | Corliss et al. | |
| 5,617,777 A | 4/1997 | Davis et al. | |
| 5,776,530 A | 7/1998 | Davis et al. | |
| 5,988,051 A | 11/1999 | Hashiguchi et al. | |
| 6,009,794 A | 1/2000 | Casey et al. | |
| 6,068,872 A | 5/2000 | Hashiguchi et al. | |
| 6,131,564 A | 10/2000 | Song | |
| 6,182,561 B1 | 2/2001 | Garner et al. | |
| 6,202,543 B1 | 3/2001 | Moya et al. | |
| 6,254,790 B1 | 7/2001 | King et al. | |
| 6,405,738 B1 | 6/2002 | Clark et al. | |
| 6,777,009 B1 | 8/2004 | Shealy | |
| 7,775,154 B2 * | 8/2010 | Hutchinson | A47J 37/1261 |
| | | | 248/278.1 |
| 8,497,691 B2 | 7/2013 | Behle et al. | |
| 2005/0236402 A1 | 10/2005 | Christiaansen et al. | |
| 2006/0130670 A1 | 6/2006 | Johnson et al. | |
| 2006/0208105 A1 * | 9/2006 | Prociw | F23D 11/107 |
| | | | 239/406 |
| 2007/0012367 A1 | 1/2007 | Hotz et al. | |
| 2007/0204858 A1 | 9/2007 | Abelbeck | |
| 2008/0121578 A1 | 5/2008 | Burkett et al. | |
| 2009/0084273 A1 | 4/2009 | Lackman et al. | |
| 2009/0309619 A1 | 12/2009 | Behle et al. | |
| 2010/0116345 A1 | 5/2010 | Florkey et al. | |
| 2010/0212510 A1 | 8/2010 | Hutson et al. | |
| 2010/0300980 A1 | 12/2010 | Burkett et al. | |
| 2010/0326288 A1 | 12/2010 | Tiszai et al. | |
| 2011/0129578 A1 | 6/2011 | Feinberg et al. | |
| 2012/0256715 A1 | 10/2012 | Fullerton et al. | |
| 2013/0036916 A1 | 2/2013 | Burkett et al. | |
| 2013/0098847 A1 | 4/2013 | Lambert et al. | |
| 2013/0228637 A1 * | 9/2013 | Kah, Jr. | B05B 1/1627 |
| | | | 239/562 |
| 2014/0004234 A1 | 1/2014 | Mosteller et al. | |
| 2015/0135966 A1 | 5/2015 | Hulett et al. | |
| 2015/0144008 A1 | 5/2015 | Shirali et al. | |
| 2015/0159882 A1 | 6/2015 | Heinz | |

FOREIGN PATENT DOCUMENTS

| | | | |
|---|---|---|---|
| CN | 202238361 U | 5/2012 | |
| CN | 202962709 U | 6/2013 | |
| CN | 105080742 A | 11/2015 | |
| EA | 11874 B1 | 6/2009 | |
| EP | 2140789 A1 | 1/2010 | |
| EP | 2398367 A1 | 12/2011 | |
| JP | 63150034 | 6/1988 | |
| KR | 20150014634 A | 2/2015 | |
| SU | 549140 A1 | 3/1977 | |
| WO | 9406335 A1 | 3/1994 | |
| WO | 2007035556 A2 | 3/2007 | |
| WO | 2017161219 A1 | 9/2017 | |

OTHER PUBLICATIONS

International Searching Authority, Search Report and Written Opinion issued in International Application No. PCT/US2017/022872 dated Jun. 12, 2017 (11 pages).

International Searching Authority, Search Report and Written Opinion issued in International Application No. PCT/US2017/022866 dated Jul. 24, 2017 (12 pages).

International Searching Authority, Search Report and Written Opinion issued in International Application No. PCT/US2017/022997 dated Aug. 17, 2017 (13 pages).

European Patent Office, Extended European Search Report issued in Application No. 17767590.7-1006 dated Aug. 13, 2019 (6 pages).

European Patent Office, Extended European Search Report issued in Application No. 17767646.7-1006 dated Aug. 13, 2019 (7 pages).

European Patent Office, Extended European Search Report issued in Application No. 17767592.3-1006 dated Sep. 19, 2019 (5 pages).

Federal Service for Intellectual Property (Russian Patent Office), Decision to Grant and Search Report issued in Application No. 2018136367 dated May 25, 2020 (English Translation) (22 pages).

European Patent Office, Communication under Rule 71(3) EPC (Intention to Grant) issued in Application No. 17 767 646.7-1004 dated Jun. 8, 2020 (7 pages).

Russian Federal Institute of Industrial Property, Office Action and Search Report issued in RU 2018136366/10(060137) dated Jun. 11, 2020 with English Translations (14 pages).

Austrailian Government IP Austrailia, Examination Report No. 1 issued in AU 2017234798 dated Jul. 20, 2020 (3 pages).

European Patent Office, Extended European Search Report issued in Application No. 20185641.6-1004 dated Sep. 1, 2020 (6 pages).

* cited by examiner

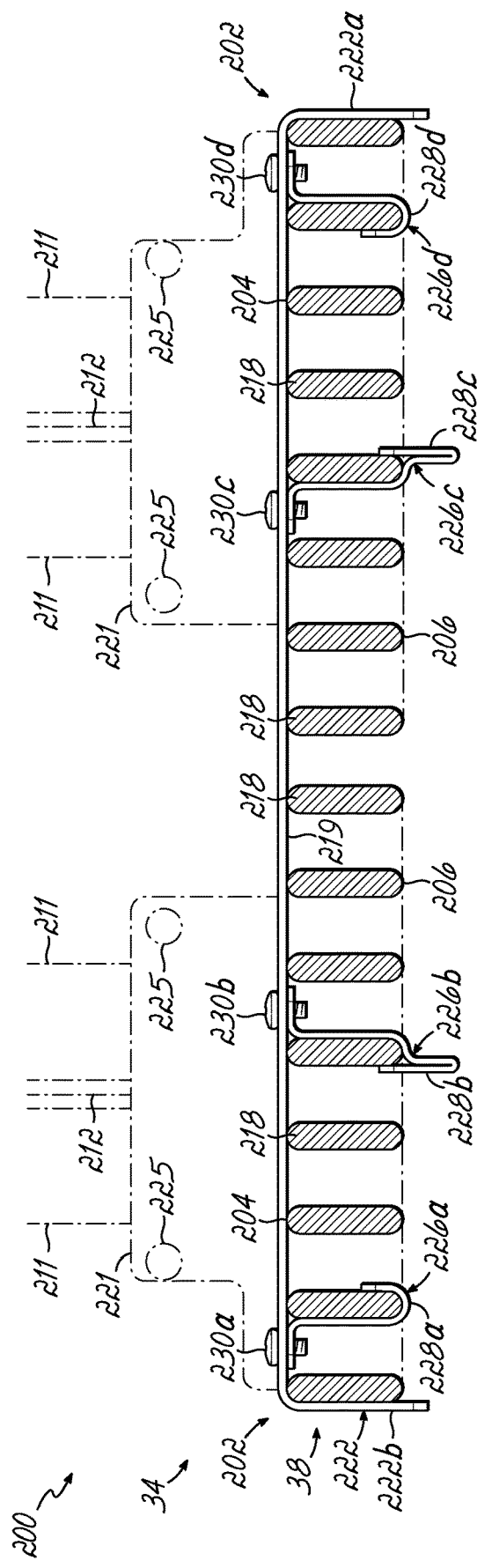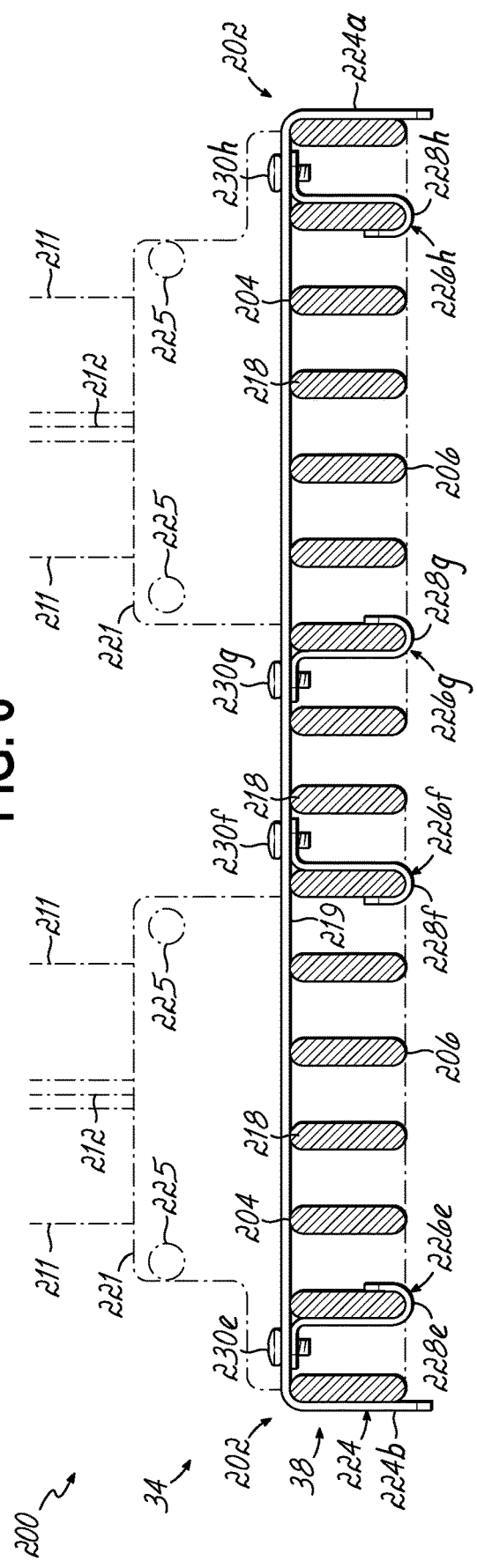

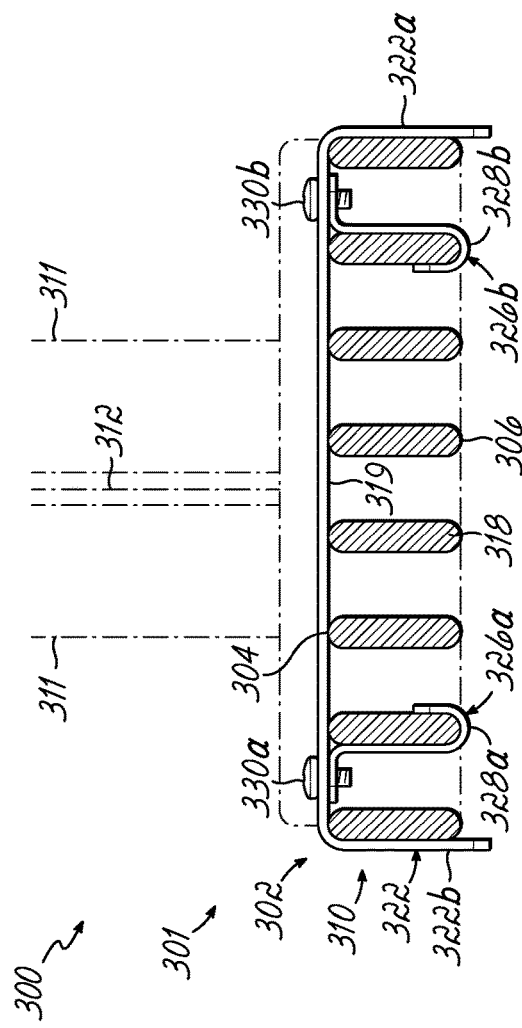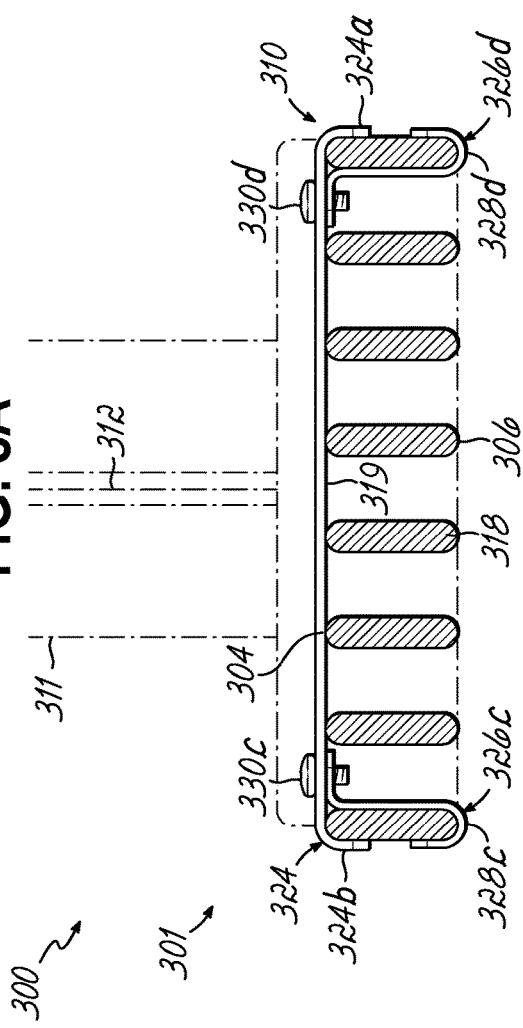

COOKING SYSTEMS WITH WASHING ELEMENTS AND SPREADER BAR

CROSS-REFERENCE TO RELATED APPLICATIONS

This application is a divisional of U.S. patent application Ser. No. 16/082,086, filed Sep. 4, 2018, which is a 371 National Phase application of PCT/US2017/022866, filed Mar. 17, 2017, which claims the priority of U.S. Provisional Patent Application Ser. No. 62/309,650, filed on Mar. 17, 2016, the disclosures of which are incorporated by reference herein.

TECHNICAL FIELD

This disclosure relates generally to fryers, such as open fryers or pressure fryers. More particularly, this disclosure relates to apparatus and methods of using washing elements and spreader bars coupled to heating elements in cooking chambers.

BACKGROUND

Oil-based frying is commonly used as a cooking method for a wide range of food, such as poultry, fish, potato products, and the like. Commercial fryers include one or more cooking chambers (also referred to as fry pots) that are filled with a cooking medium, such as oil or solid fats. Heat is typically provided to the cooking medium using an electrical heating element submerged in the cooking medium or a gas burner thermally coupled to the cooking medium though the walls of the cooking chamber. When the cooking medium reaches a preset cooking temperature, food products are placed into the cooking medium for a predetermined amount of time during which the food products are cooked by heat from the cooking medium. To facilitate insertion and removal of the food products, the food products are typically placed inside a container (e.g. a wire basket), and the container is lowered into the cooking medium for the predetermined amount of time.

The cooking medium is normally re-used for multiple cooking cycles, which may include cooking cycles for different food products. However, the cooking medium degrades over time. This degradation may be due to contamination by particles shed by the food products being cooked and/or from chemical degradation due to heat, oxidation, and reactions with the food products. In addition, as food particles accumulate in the cooking medium, the flavor characteristics of the food particles may become infused in the cooking medium. This infusion may adversely affect the quality of cooked food products. In some instances, such changes to the cooking medium do not become apparent until a significant change has occurred. These chemical reactions and flavor infusions may shorten the useful life of the cooking medium, and may result in more frequent replacement of the cooking medium. These undesirable particles, may remain in the fryer and accumulate at the bottom and/or sides of the cooking chamber. As used herein, the particles may include, for example, crumbs, silt, clumps, cracklings, cooking fluid deterioration compounds, and the like or combinations thereof. Additionally, the particles may include suspended food particles ranging from dust-sized particles to larger pieces of crackling or crumbs, and small pieces of food products.

For at least these reasons, the cooking medium may be filtered periodically to maintain cooking quality and to prolong the operational lifetime of the cooking medium. Frequent filtering may extend the useful life of the cooking medium, thereby reducing the cost of operating the fryer by reducing the frequency with which the cooking medium must be replaced. The cost savings from filtering may be particularly evident when using a cooking medium that contains reduced amounts of trans-fats, which have become popular, but are typically more expensive than other types of cooking media.

Thus, it may be economically beneficial to filter the cooking medium to extend its useful life by increasing the frequency of filtering, using such cooking media only for selected food products, and/or reducing the volume (and size) of the cooking chamber in which such cooking media are used. Nevertheless, when this cooking medium is returned to the cooking chamber, the filtering process may reduce the amount of cooking medium remaining in the cooking chamber. If the amount of cooking medium drops below a predetermined level, then the food product that is cooked in the cooking chamber may not be completely cooked and/or consistently cooked, and the quality of food product cooked in the fryer may diminish.

As such, there exists a need to clean the cooking chambers of the fryer in a quick and efficient manner by eliminating the accumulation of particles within the cooking chambers that negatively impact the quality of the food product cooked by the cooking medium within the cooking chambers. Eliminating the accumulation of particles may be beneficial in hard to reach areas (e.g. the corners of cooking chamber). Quick and efficient cleanings may also allow the cooking chambers of the fryer to increase the throughput of food products over a period of time.

SUMMARY

In an embodiment of the invention, a fryer is provided. The fryer includes a cooking chamber and a washing element. The cooking chamber includes a plurality of side walls connected to and extending upwardly from a bottom wall. The plurality of side walls and the bottom wall collectively surround an interior configured to receive a cooking medium. The washing element is coupled to the bottom wall of the cooking chamber. The washing element includes lower and upper portions, and a cover coupled to the upper portion. The lower portion includes a passage that is fluidically coupled to a fill port and configured to receive the cooking medium. The upper portion extends above the bottom wall of the cooking chamber and includes a plurality of spray jet nozzles fluidically coupled to the passage. The plurality of spray jet nozzles are separated at predetermined angles relative to one another around a periphery of the upper portion of the washing element to orient the plurality of spray jet nozzles so as to spray a plurality of pressurized streams of the cooking medium to predetermined areas of the cooking chamber. The predetermined areas include at least one corner of the cooking chamber. The cover is coupled to the upper portion, and directs the cooking medium into the plurality of spray jet nozzles.

In another embodiment of the invention, a fryer includes a cooking chamber, a heating element, a spreader bar, and at least one attachment feature that couples the spreader bar to the heating element. The cooking chamber includes a plurality of side walls connected to and extending upwardly from a bottom wall. The plurality of side walls and the bottom wall collectively surround an interior configured to receive a cooking medium. The heating element is disposed within the interior of the cooking chamber. The heating element includes an electric heating coil arranged in a serpentine pattern. The electric heating coil includes upper and lower surfaces. The spreader bar is coupled to the upper surface of the electric heating coil and at a predetermined distance away from the bottom wall. The spreader bar maintains the electric heating coil in the serpentine pattern.

In another embodiment of the invention, a method of cleaning a fryer using a washing element coupled to a bottom wall of a cooking chamber is provided. The method includes spraying a plurality of pressurized streams of a cooking medium into predetermined areas including at least one corner of the cooking chamber using a washing element. The washing element includes a plurality of spray jet nozzles that are separated at predetermined angles relative to one another around a periphery of an upper portion of the washing element to orient the plurality of spray jet nozzles. At least one corner is defined along a junction of the bottom wall and a plurality of side walls adjacent the bottom wall.

The above summary may present a simplified overview of some embodiments of the invention in order to provide a basic understanding of certain aspects of the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

FIG. 6 is a cross-sectional view of the first body portion of the spreader bar taken across line 6-6 of FIG. 4.

FIG. 7 is a cross-sectional view of the second body portion of the spreader bar taken across line 7-7 of FIG. 4.

FIG. 8A is a cross-sectional view of the first body portion of the spreader bar taken across line 8A-8A of FIG. 8.

FIG. 8B is a cross-sectional view of the second body portion of the spreader bar taken across line 8B-8B of FIG. 8.

DETAILED DESCRIPTION

Exemplary embodiments of the present invention, and their features and advantages, may be understood by referring to the Figures, where like numerals are used for corresponding parts in the various drawings.

Figure 1:
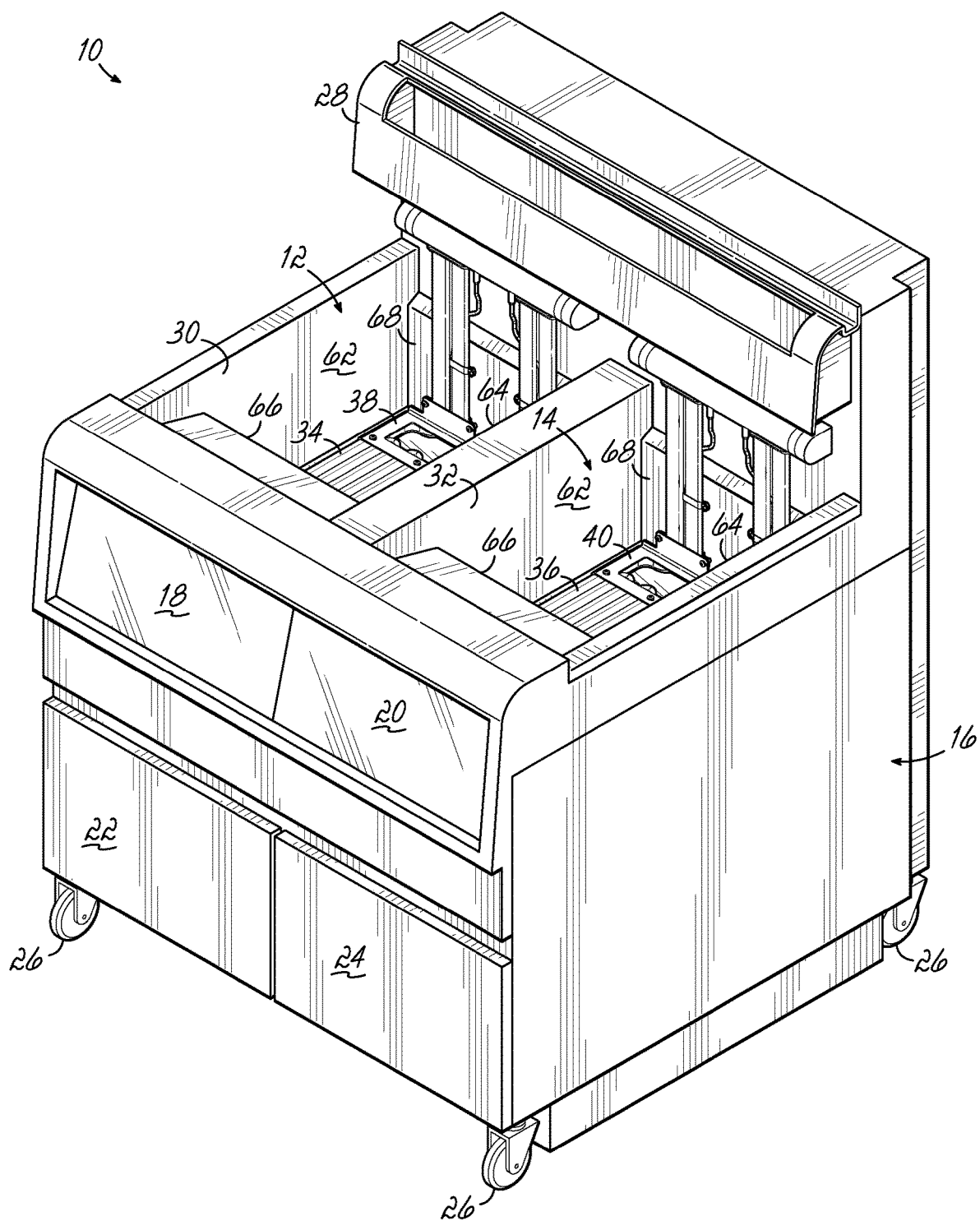
FIG. 1 is a perspective view of a fryer according to an exemplary embodiment of the invention.

Referring now to the figures, FIG. 1 depicts an exemplary fryer 10 in accordance with an exemplary embodiment. The fryer 10 includes cooking chambers 12, 14, a cabinet 16, control panels 18, 20, access panels 22, 24, wheels 26, and a basket hanger 28. Each of the cooking chambers 12, 14, cabinet 16, access panels 22, 24, and basket hanger 28 may be constructed from stainless steel, mild steel, or some other suitable material. Cooking chambers 12, 14 include interiors 30, 32 through which a food product may be placed. Electric heating elements 34, 36 are coupled to spreader bars 38, 40 and disposed within the interiors 30, 32. The spreader bars 38, 40 are designed to improve washing out the cooking chambers 12, 14, as will be described in greater detail below while not interfering with the flow of the cooking medium 42 within the cooking chambers 12, 14.

Food products may be placed into the cooking chambers 12, 14, for example, by lowering a basket (not shown) containing the food product into the cooking chamber 12, 14. At completion of a cooking cycle, the basket may be removed from the cooking chamber 12, 14 and hung from the basket hanger 28 to allow excess cooking medium 42 to drain back into the cooking chamber 12, 14. Each of the cooking chambers 12, 14 may be associated with a corresponding one of the control panels 18, 20 to provide a human-machine interface for operating the fryer 10. The control panels 18, 20 may receive commands from, and display information regarding a status of the fryer 10 to an operator. The access panels 22, 24 may provide access to the interior of cabinet 16 to, for example, service the components of the fryer 10.

Figure 3:
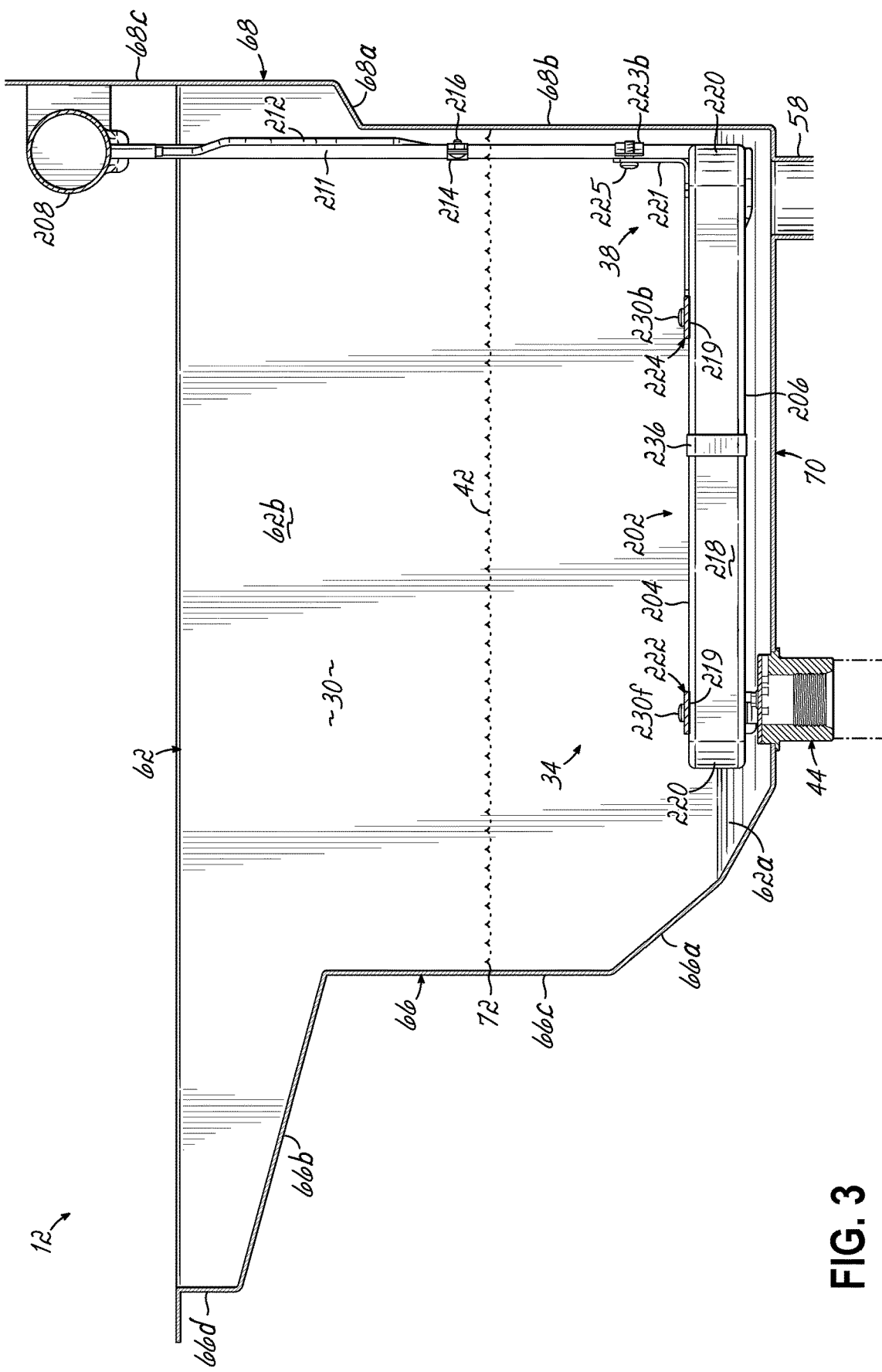
FIG. 3 is a cross-sectional view of a full cooking chamber including an electric heating element, a spreader bar and a washing element according to an exemplary embodiment.

An exemplary fryer 10 is shown as having a separate control panel 18, 20 for each cooking chamber 12, 14. However, it should be understood that one control panel could be configured to control multiple cooking chambers, and embodiments of the invention are not limited to fryers having a separate control panel 18, 20 for each cooking chamber 12, 14. Although the fryer 10 depicted in FIG. 1 is an electric-heated open fryer having two cooking chambers 12, 14, it should be further understood that some embodiments may also be used with pressure fryers, as well as fryers having a different number of cooking chambers. FIGS. 1 and 3 show the electric heating elements 34, 36 as electrical heating elements (e.g., electric heating coils immersed in the cooking medium 42). However, gas heating elements (e.g., a gas burner and heat exchanger that transfers heat from the burner to the cooking medium 42) may be incorporated in accordance with various aspects of the present disclosure.

Figure 2:
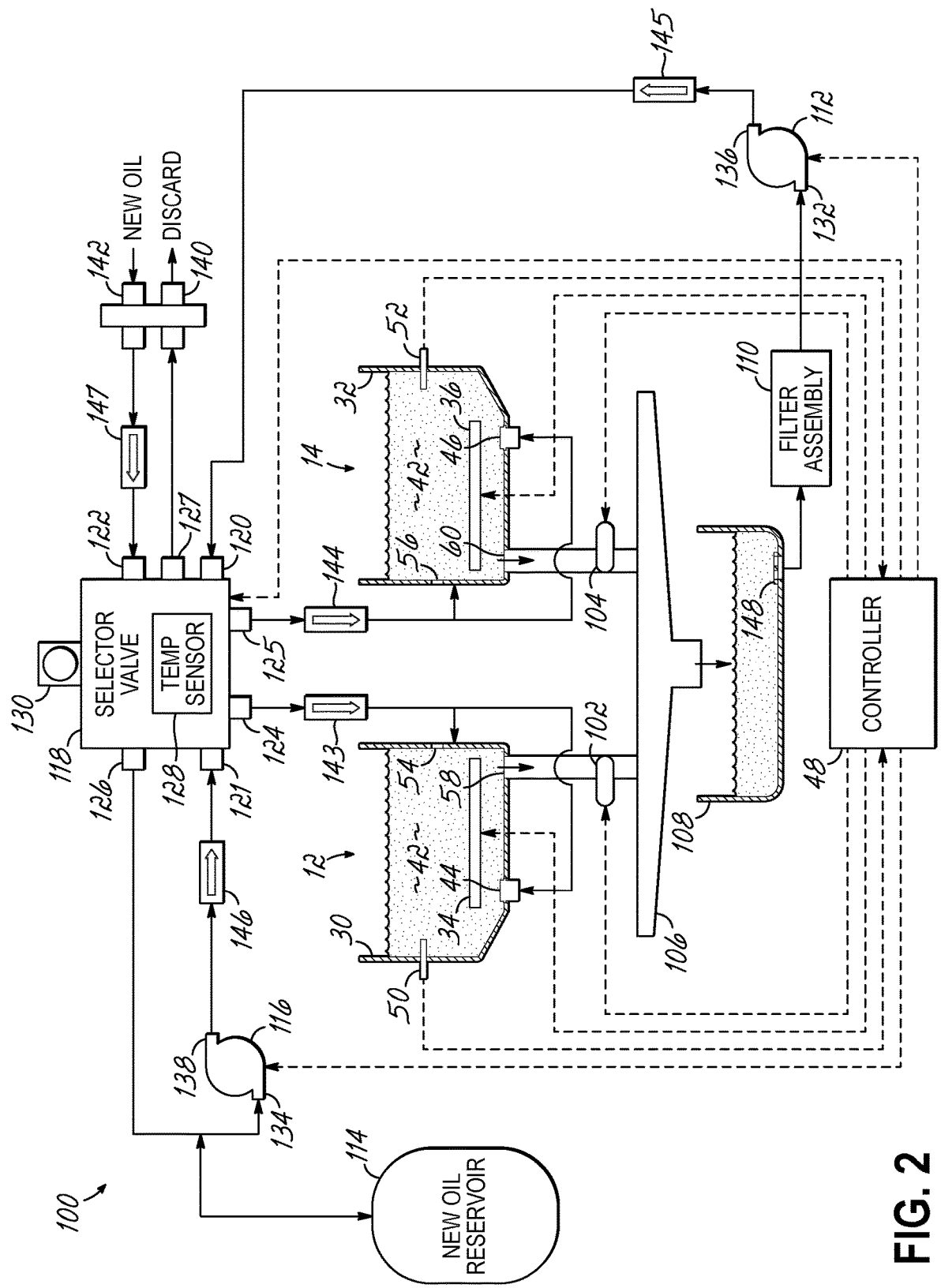
FIG. 2 is a diagrammatic view of the fryer of FIG. 1, showing two cooking chambers, a filtration system, and a controller.

Referring now to FIG. 2, in addition to cooking chambers 12, 14, the fryer 10 may include a cooking medium handling system 100 and a controller 48. The cooking chambers 12, 14 respectively include electric heating elements 34, 36 (schematically shown), temperature sensors 50, 52, fill ports 54, 56, drain ports 58, 60, and washing elements 44, 46. The cooking chambers 12, 14 are configured to be at least partially filled with a cooking medium 42. Suitable cooking mediums may include plant-based fats, animal-based fats, and/or synthetic (e.g., hydrogenated) fats. While the electric heating elements 34, 36 are shown as being disposed within cooking chambers 12, 14 for heating the cooking medium 42, the electric heating elements 34, 36 may alternatively be disposed adjacent the cooking chamber 12, 14 for heating the cooking medium 42.

The cooking medium handling system 100 may include drain valves 102, 104, a drain manifold 106, a drain pan 108 including a filter assembly 110, a filter pump 112, a reservoir 114 of fresh cooking medium, a reservoir pump 116, and a selector valve 118. The selector valve 118 may include a plurality of input ports 120-122 and a plurality of output ports 124-127. A temperature sensor 128 may be located in the selector valve 118, or in another suitable location, to enable the controller 48 to determine the temperature of the cooking medium 42 passing through the cooking medium handling system 100.

The selector valve 118 is configured to selectively fluidically couple one or more of the input ports 120-122 to one or more of the output ports 124-127. To this end, the selector valve 118 may comprise a rotary valve having a transverse plug (not shown) coupled to a motor 130. The motor 130 may cause the selector valve 118 to fluidically couple a selected input port to a selected output port by rotating the transverse plug to one of a plurality of predetermined positions. In an alternative embodiment of the invention, the selector valve 118 may comprise an assembly of valves that are configured to provide the desired selective fluidic coupling in response to signals from the controller 48. In this alternative embodiment, the selector valve 118 may comprise an assembly including a plurality of valves connected to a manifold.

The filter pump 112 and reservoir pump 116 may each include an inlet 132, 134 on a suction side of the filter pump 112, and an outlet 136, 138 on a pressure side of the pump.

The inlet 132 of filter pump 112 may be fluidically coupled to the drain pan 108 by the filter assembly 110, and the outlet 136 of the filter pump 112 may be fluidically coupled to an input port 120 of selector valve 118. Activation of the filter pump 112 may cause cooking medium 42 to be drawn from the drain pan 108, the filter assembly 110 and provided to the selector valve 118. The selector valve 118 may in turn provide the filtered cooking medium 42 to one of the cooking chambers 12, 14 for reuse and/or to a discard port 140 for disposal.

Although filter assembly 110 is depicted as being coupled to the inlet 132 of filter pump 112 in the exemplary embodiment illustrated by FIG. 2, it should be understood that the cooking medium handling system 100 is not limited to the specific arrangement of components depicted. For example, the filter assembly 110 could be coupled to the outlet 136 of filter pump 112 rather than the inlet 132 so that cooking medium 42 is pushed through the filter assembly 110 rather than drawn through the filter assembly 110. In either case, the filter assembly 110 may include a housing configured to accept a filter for filtering the cooking medium 42. According to an exemplary embodiment, a filter screen 148 may be permanently coupled to the drain pan 108. Regular use of filtration cycles to clean the cooking medium 42 may reduce consumption of cooking medium 42 and increase the availability of the fryer 10 by providing hot filtered cooking medium 42 to the cooking chambers 12, 14.

The inlet 134 of reservoir pump 116 may be fluidically coupled to the reservoir 114, and the outlet 138 of the reservoir pump 116 may be fluidically coupled to an input port 121 of selector valve 118. Activation of reservoir pump 116 may cause cooking medium 42 to be drawn from reservoir 114 and provided to selector valve 118. The selector valve 118 may in turn provide the fresh cooking medium 42 to one of the cooking chambers 12, 14 to refill or replenish the cooking medium 42. A fill port 142 may be coupled to an input port of the selector valve 118 to facilitate the addition of cooking medium 42 to the reservoir 114. The cooking medium handling system 100 may further include check valves 143-147 that prevent cooking medium 42 from back-flowing from the cooking chambers 12, 14 into the selector valve 118, or from the selector valve 118 into either the filter pump 112, the reservoir pump 116, or the fill port 142.

The controller 48 may be in communication with electric heating elements 34, 36 and temperature sensors 50, 52 of each of the cooking chambers 12, 14, and also the drain valves 102, 104, the filter pump 112, the reservoir pump 116, the temperature sensor 128, and the motor 130 of selector valve 118. The controller 48 may control the various cooking and maintenance cycles of the fryer 10 by transmitting signals to, and receiving signals from these components of the fryer 10. The controller 48 may also be coupled to the control panels 18, 20 to provide operating information to, and receive input from the operator of the fryer 10. The controller 48 may control the temperature of the cooking medium 42 in each cooking chamber 12, 14 by selectively activating the respective electric heating element 34, 36, and may control the filtering and addition of cooking oil by selectively activating the drain valves 102, 104, filter pump 112, reservoir pump 116, and motor 130 of selector valve 118.

FIGS. 3-7 show an exemplary embodiment of an arrangement 200 where the spreader bar 38 is mounted to the top of the electric heating element 34, as will be described in greater detail below. While FIG. 3 is a cross-sectional view of cooking chamber 12, these principles apply equally to cooking chamber 14 and its corresponding components (e.g. electric heating element 36, spreader bar 40, and washing element 46). For the sake of brevity, the spreader bar 38 in relation to cooking chamber 12 is intended to be representative of spreader bar 40 in relation to cooking chamber 14.

Figure 12:
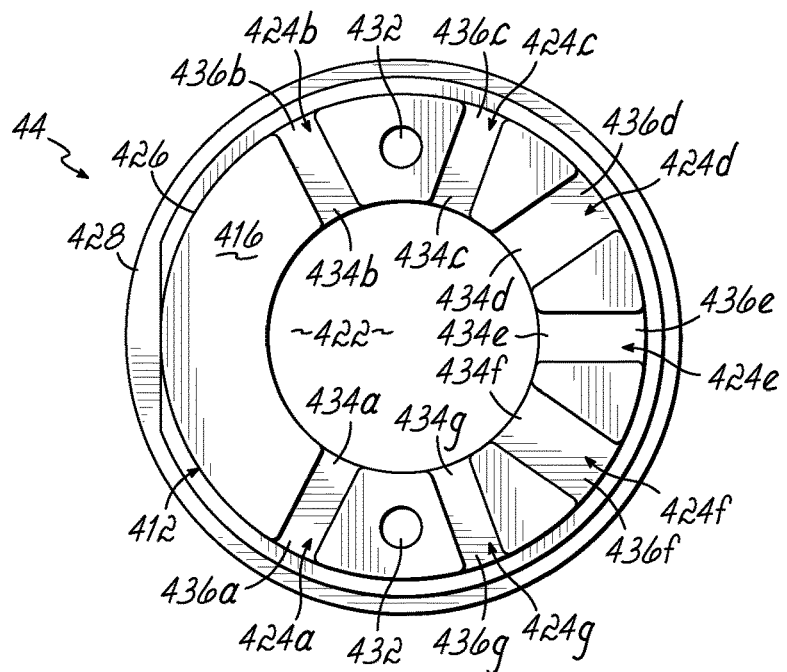
FIG. 12 is a top view of the washing element of FIG. 11, with the cover removed.

The cooking chamber 12 includes a plurality of side walls. As shown, the plurality of side walls includes first and second side walls 62, 64 (shown in FIG. 1), first and second end walls 66, 68, and a bottom wall 70 collectively forming an interior 30. Persons skilled in the art would appreciate that the plurality of side walls may include more or fewer side walls as desired. A cooking medium 42 may be placed into the interior 30 and filled to a predetermined level (e.g. fill line 72). Persons skilled in the art would also appreciate that the first and second side walls 62, 64, first and second end walls 66, 68 and the bottom wall 70 may include a plurality of wall sections that collectively form each respective wall, allowing each respective wall to be curved or angled, if desired. Specifically, as shown in FIG. 3, the first end wall 66 includes angled wall sections 66a, 66b and vertical wall sections 66c, 66d. Likewise, the second end wall 68 includes angled wall section 68a and vertical wall sections 68b, 68c. Similarly, as shown in FIG. 12, the first side wall 62 includes an angled wall section 62a and a vertical wall section 62b, and the second side wall 64 includes an angled wall section 64a and a vertical wall section 64b.

Figure 4:
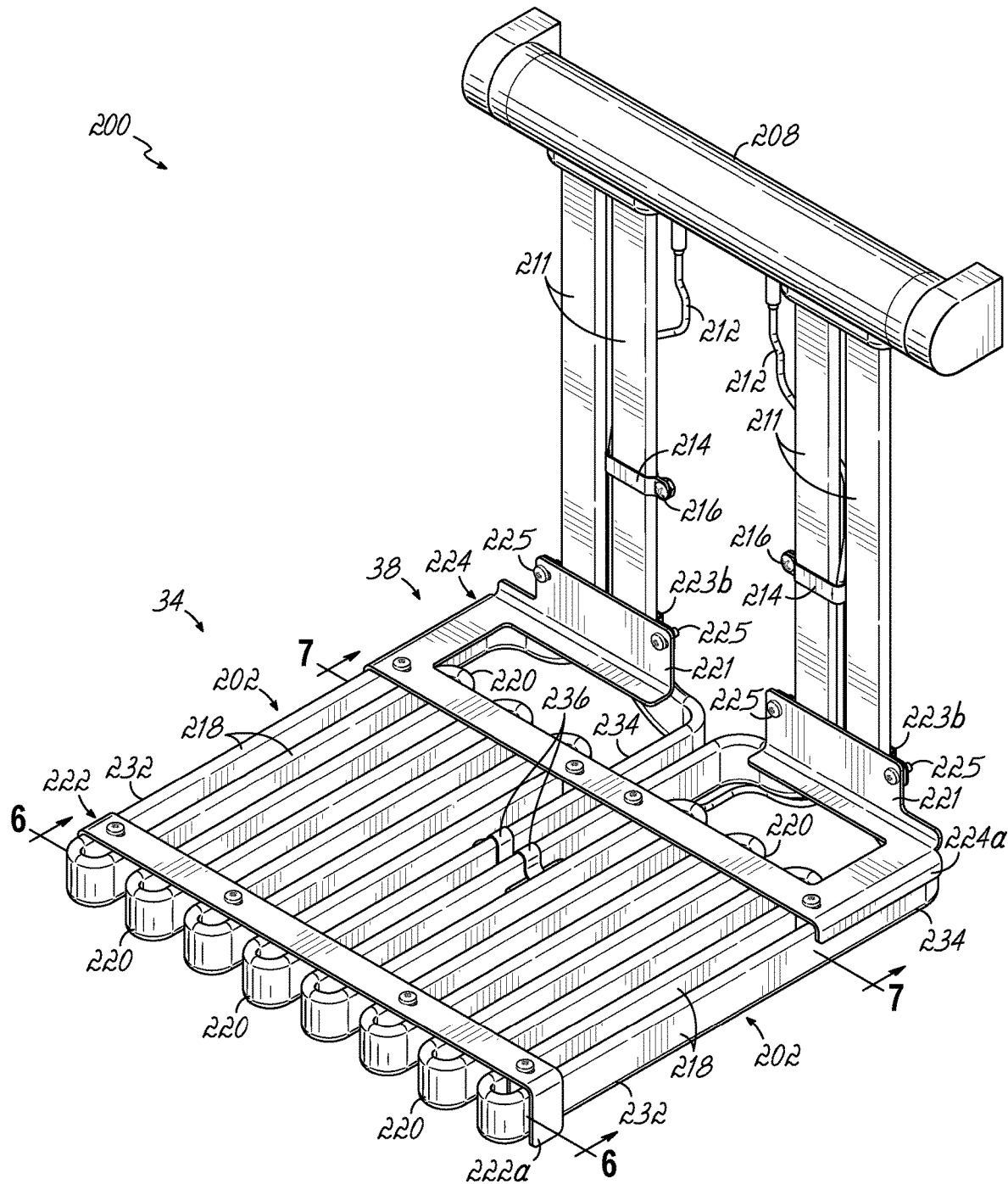
FIG. 4 is a front perspective view of a spreader bar, where the spreader bar is coupled to the top surface of the electric heating coils.
Figure 5:
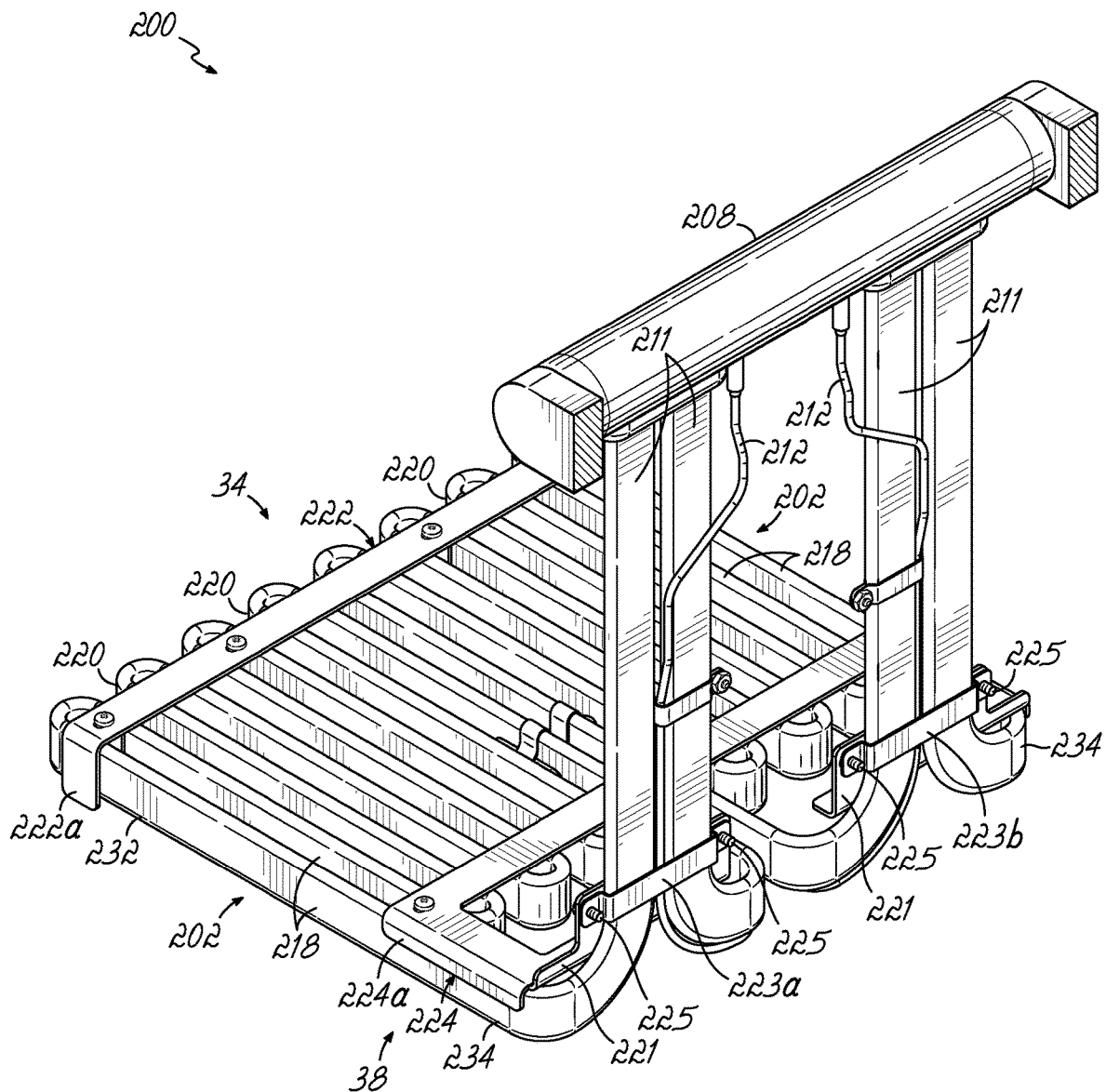
FIG. 5 is a rear perspective view of the electric heating element and the spreader bar of FIG. 4.

Disposed within the interior 30 of the cooking chamber 12 is the electric heating element 34. The electric heating element 34 includes two electric heating coils 202 arranged in a serpentine pattern. The electric heating coils 202 include upper and lower surfaces 204, 206. As shown in FIGS. 3-5, the electric heating element 34 includes a rotatable structure 208 that is coupled to the second end wall 68 which enables the electric heating element 34 to be rotated upwardly and downwardly, as desired. The electric heating coils 202 are separated from the rotatable structure 208 by one or more arms 211. One or more wires 212 may be coupled to the arms 211 using attachment features 214 (e.g. brackets) and fasteners 216 (e.g. screws). As shown in FIG. 4, the electric heating coils 202 include eight generally parallel rows 218 that are spaced apart from an adjacent row by a predetermined distance, which may be the same or vary from row to row. Looped portions 220 connect adjacent generally parallel rows 218.

The spreader bar 38 is coupled to the upper surfaces 204 of the electric heating coils 202 and is designed to maintain the generally parallel rows 218 of the electric heating coils 202 in the predetermined serpentine pattern. More specifically, a lower surface 219 of the spreader bar 38 may be in direct contact with upper surfaces 204 of the electric heating coils 202. As shown, the spreader bar 38 may also separate the electric heating coils 202 at a predetermined distance away from the bottom wall 70 which provides additional clearance for the washing element 44 to spray the pressurized cooking medium 42 between the bottom wall 70 of the cooking chamber 12 and the lower surfaces 206 of the electric heating coils 202.

As more clearly shown in the front and rear perspective views of FIGS. 4 and 5, the spreader bar 38 includes first and second body portions 222, 224. The first body portion 222 is disposed generally adjacent the first end wall 66 and the second body portion 224 is disposed generally adjacent the second end wall 68. The first body portion 222 may include downwardly facing first and second side walls 222a-b that extend around the upper surfaces 204 of the electric heating coils 202 towards the bottom wall 70. Likewise, the second body portion 224 may include downwardly facing first and second side walls 224a-b that extend around the upper surfaces 204 of the electric heating coils 202 towards the bottom wall 70. In an exemplary embodiment, over 50% of the first and second body portions 222, 224 of the spreader bar 38 are disposed above the upper surfaces 204 of the electric heating coils 202 and away from the bottom wall 70 of the cooking chamber 12. As shown in FIGS. 4 and 5, the second body portion 224 may include one or more upper lips 221 that are attached to the arms 211 of the electric heating element 34 using attachment features 223a-b (e.g. clips) and fasteners 225 (e.g. screws).

FIGS. 6 and 7 show two respective cross-sectional views of FIG. 4 where the spreader bar 38 is coupled to the electric heating element 34 using a plurality of attachment features 226a-h (e.g. clips having hook portions 228a-h that extend around the lower surfaces 206 of the electric heating coils 202). The clips are removably coupled to the spreader bar 38 using fasteners 230a-h (e.g. screws). As shown in FIG. 6, hook portions 228b-c of the attachment features 226b-c have downwardly extending projections that may be in direct contact with the bottom wall 70 of the cooking chamber 12, causing the lower surfaces 206 of the electric heating coils 202 to be at a predetermined distance away from the bottom wall 70. More specifically, attachment features 226a-d couple the first body portion 222 to front portions 232 of the electric heating coils 202 and attachment features 226e-h couple the second body portion 224 to rear portions 234 of the electric heating coils 202. While not shown, it is envisioned that some or all of the attachment features may be formed as a unitary piece with the spreader bar 38. Additionally, while not shown, the electric heating element 34 may be permanently coupled to the spreader bar 38 using welds or other permanent fixing structure. Additional clips 236 (shown in FIGS. 4 and 5) may be used to hold temperature sensors in a desired position proximate the electric heating coils 202.

Locating the spreader bar 38 in this manner, so as to be effectively entirely above the electric heating element 34, and so that there is space between the bottom wall 70 of the cooking chamber 12 and the lower surface 219 of the spreader bar 38, improves cleaning effectiveness and ultimately increases the useable volume of the cooking chamber 12, while not adversely affecting the electric heating element 34, which is approximately the same size. As a result, if the spreader bar 38 is located generally under the electric heating element 34, the spreader bar 38 would likely need to be raised 0.25 inch or more to achieve a similar performance, which would decrease the useable volume of the cooking chamber 12. As shown, parallel rows 218 of the electric heating coils 202 are disposed front to back in the direction of flow, so that any obstruction to the flow is minimized since the spreader bar 38 which extends approximately perpendicular to the primary flow path of the washing element 44.

Figure 8:
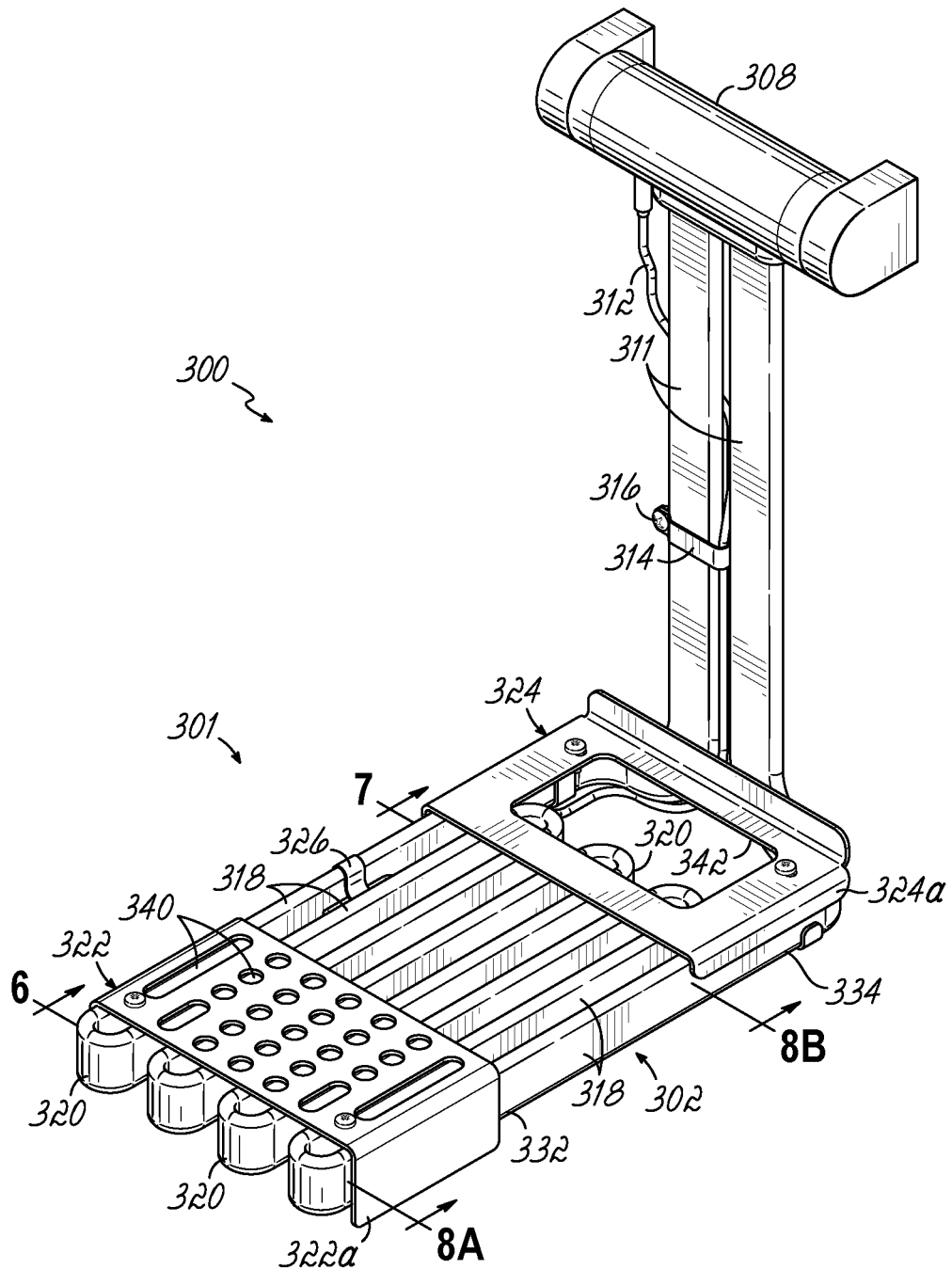
FIG. 8 is a front perspective view of a spreader bar according to another exemplary embodiment for a split cooking chamber, where the spreader bar is coupled to the top surface of the electric heating coils.

FIGS. 8-8B show an arrangement 300 including an electric heating element 301 coupled to a spreader bar 310 for a split cooking chamber 502, 504 (shown in FIG. 13B) according to another exemplary embodiment. The spreader bar 310 and the electric heating element 301 include many of the same elements as the previously described embodiment (elements have been provided with similar reference numbers in the 300 series where the elements are substantially similar or identical). For example, this embodiment again includes an electric heating coil 302, upper and lower surfaces 304, 306 of the electric heating coil 302, a rotatable structure 308, arms 311, wire 312, an attachment feature 314, a fastener 316, parallel rows 318 of the electric heating coil 302, a lower surface 319 of the spreader bar 310, looped portions 320 of the electric heating coil 302, a first body portion 322, first and second side walls 322a-b of the first body portion 322, a second body portion 324, first and second side walls 324a-b of the second body portion 324, fasteners 325, attachment features 326a-d having hook portions 328a-d, fasteners 330a-d, a front portion 332 of the electric heating coil 302, and a rear portion 334 of the electric heating coil 302.

Although many of these elements have slightly modified shapes or profiles in this embodiment, the spreader bar 310 and its elements function as described above except where the differences are outlined in further detail below (the detailed description of these identical or substantially similar elements is largely not repeated herein for the sake of brevity). In this embodiment, the spreader bar 310 is shown for a split cooking chamber (shown in FIG. 13B), as opposed to FIGS. 3-7 that show a spreader bar 38, 40 for a full-size cooking chamber 12, 14.

As shown, the first body portion 322 includes a plurality of apertures 340 of various sizes that are disposed between the parallel rows 318 of the electric heating coil 302. Additionally, the second body portion 324 includes a large aperture 342. The plurality of apertures 340 and the large aperture 342 are designed to improve the flow of the cooking medium 42 as it travels past the first and second body portions 322, 324. According to an exemplary embodiment, the first body portion 322 upwardly supports the electric heating coil 302 as the basket (not shown) would force the electric heating coil 302 downwards towards the bottom surface 570, 580 of the split cooking chambers 502, 504, and this arrangement prevents the electric heating coil 302 from flexing. The second body portion 324 may have an aperture 342 to ensure the second body portion 324 is properly aligned on the electric heating coil 302.

According to another aspect, FIGS. 9-13 show various views of a washing element 44 coupled to the bottom wall 70 of the cooking chamber 12.

Figure 9:
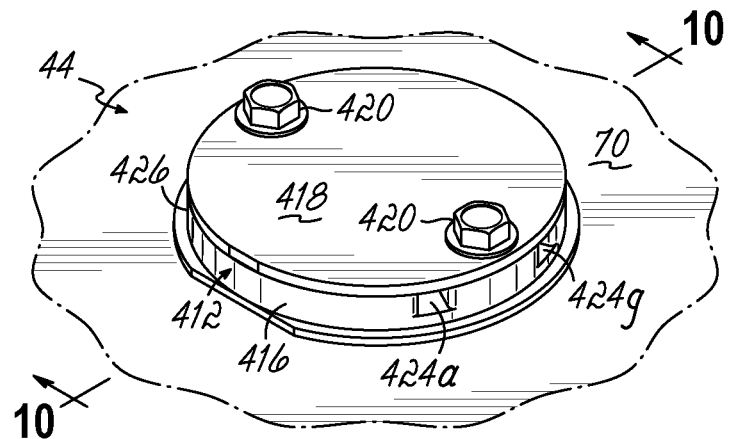
FIG. 9 is a perspective view of a washing element disposed in the bottom wall of the cooking chamber according to an exemplary embodiment.
Figure 10:
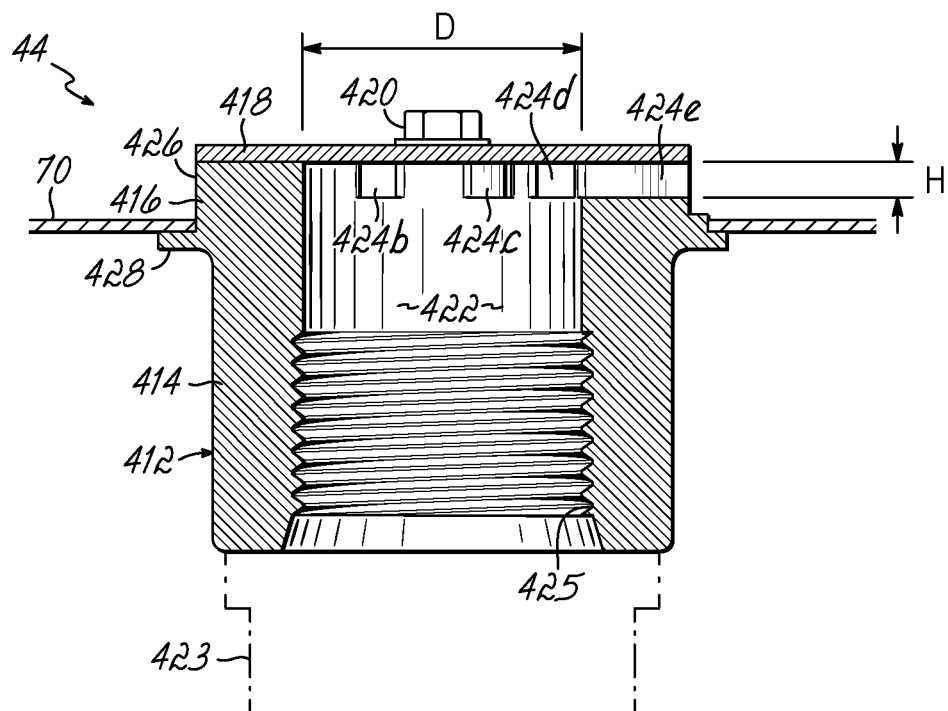
FIG. 10 is a cross-sectional view of the washing element taken across line 10-10 of FIG. 9.
Figure 11:
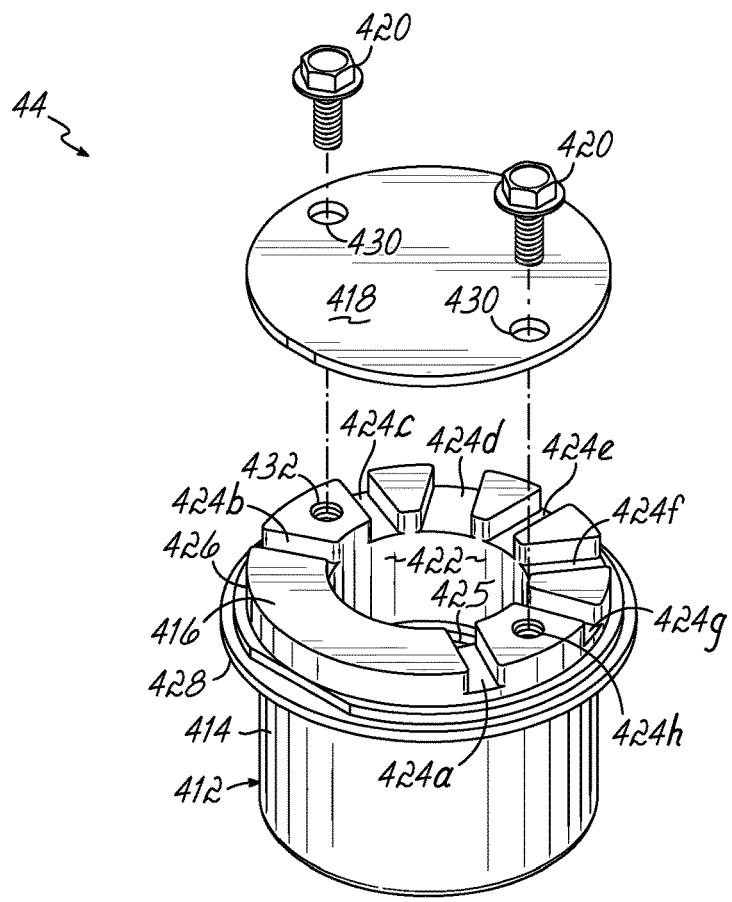
FIG. 11 is an exploded perspective view of the washing element of FIG. 9.
Figure 12A:
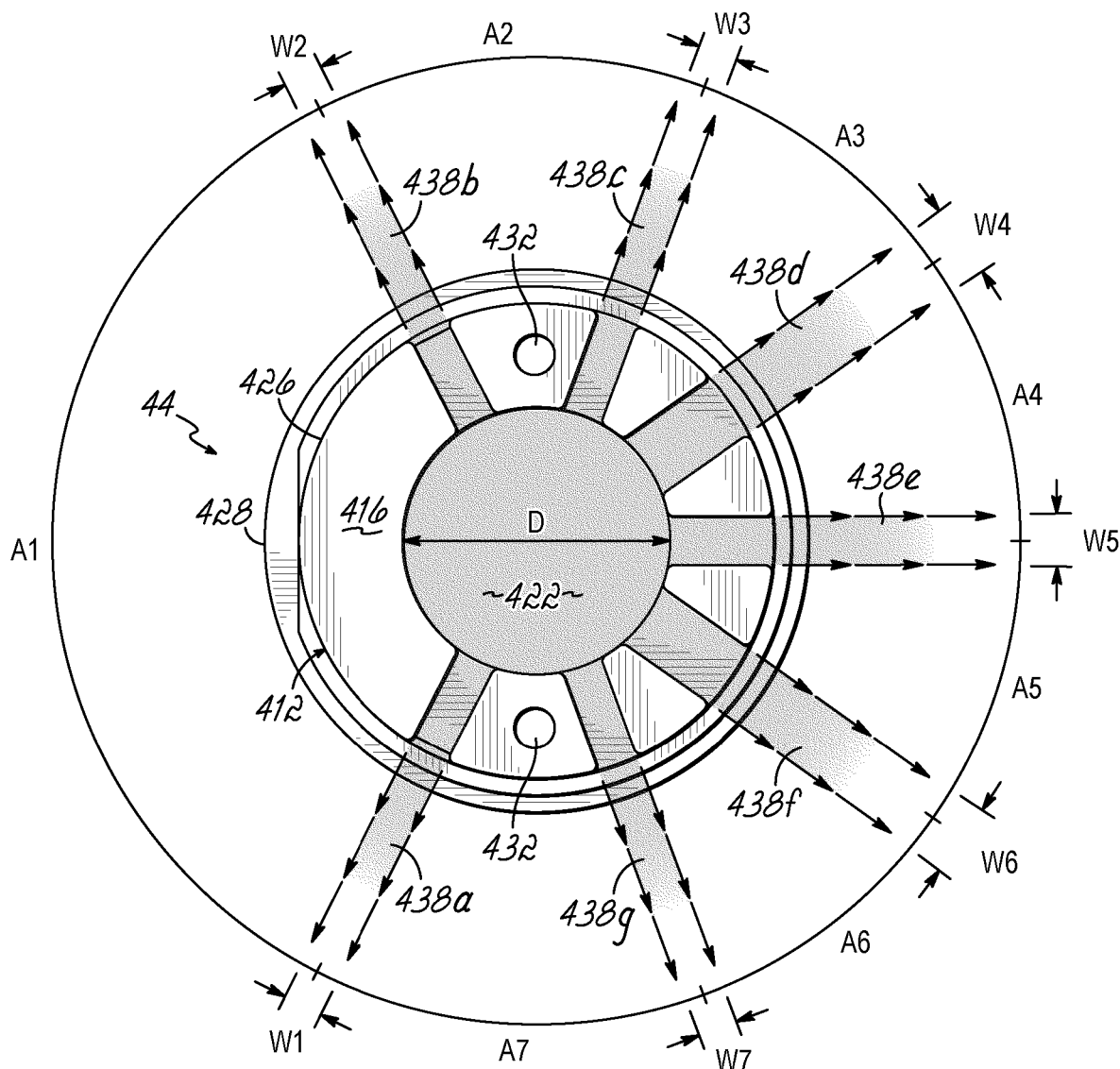
FIG. 12A is a top detailed view of the plurality of pressurized streams of the cooking medium through the plurality of spray jet nozzles of the washing element of FIG. 12.

With specific reference to FIGS. 9-11, the washing element 44 includes a body 412 with a lower portion 414 and an upper portion 416. As shown, the washing element 44 also includes a cover 418 that is removably attached to the upper portion 416 using one or more fasteners 420 to allow for performance of periodic maintenance as needed to remove build-up and/or clogs. The upper portion 416 of the washing element 44 has a circular cross-section. The total height of the washing element 44 may be 1.375 inches, exclusive of the cover 418. As shown, the lower and upper portions 414, 416 include a passage 422 that is fluidically coupled to a fill port 423 configured to receive a cooking medium 42. The passage 422 may have a diameter D of about 0.984 inch, as shown in FIGS. 12A, 13A, and 14A. While a threaded coupling 425 between the lower portion 414 and the fill port 423 is shown in FIG. 10, a variety of other coupling methods are also envisioned in alternative embodiments.

With continued reference to FIG. 10, the upper portion 416 of the washing element 44 extends above the bottom wall 70 of the cooking chamber 12 and includes spray jet nozzles 424a-g fluidically coupled to the passage 422. As shown, the spray jet nozzles 424a-g have spray channel outlets 436a-g with a height H of about 0.125 inches. The height H of the spray channel outlets 436a-g may vary according to various embodiments, as it may be desirable to correlate the velocity of the cooking medium 42 with the dimensions of the spray jet nozzles 424a-g. For example, when using an 8 GPM pump, a height H of 0.125 inches was determined during testing to provide a sufficient velocity to remove particles, while preventing the cooking medium 42 from exiting the cooking chamber 12 while washing. If the velocity of the cooking medium 42 is to increase or decrease, it may be beneficial to adjust the dimensions of the spray jet nozzles 424a-g, such as the height H of the spray channel outlets 436a-g accordingly. For example, a smaller pump may be used in conjunction with a decreased height H, while a larger pump may be used in conjunction with an increased height H.

Persons skilled in the art would appreciate that these dimensions may vary based on the size and dimensions of the particular fry pot and desired flow characteristics. The spray jet nozzles 424a-g are configured to separate the cooking medium 42 into a plurality of pressurized streams 438a-g that are directed between the bottom wall 70 of the cooking chamber 12 and the electric heating element 34. The cover 418 directs the cooking medium 42 from the passage 422 into the spray jet nozzles 424a-g. The washing element 44 may also include a lip portion 428 that may be in direct contact with the bottom wall 70 and helps to maintain the placement of the washing element 44.

FIG. 11 shows an exploded perspective view of the washing element 44, where the fasteners 420 include two screws that are insertable through apertures 430 in the cover 418 and are receivable by internal threads 432 in the upper portion 416 of the washing element 44. As used herein, fasteners 420 are intended to include bolts, ties, clips, or any other suitable fastener, or combinations thereof. Additionally, while not shown, persons skilled in the art would appreciate that the cover 418 and the upper portion 416 may be formed together as a unitary piece or may be permanently attached together using adhesive and/or welding.

Now with reference to FIG. 12, the spray jet nozzles 424a-g of this embodiment include first, second, third, fourth, fifth, sixth and seventh spray jet nozzles 424a-g. The spray jet nozzles 424a-g respectively include first, second, third, fourth, fifth, sixth and seventh spray channel inlets 434a-g fluidically coupled to the passage 422, and first, second, third, fourth, fifth, sixth and seventh spray channel outlets 436a-g are fluidically coupled to the spray channel inlets 434a-g. The spray channel inlets 434a-g are configured to allow first, second, third, fourth, fifth, sixth and seventh pressurized streams 438a-g of the cooking medium 42 to exit the washing element 44 towards predetermined areas of the cooking chamber 12.

Figure 12B:
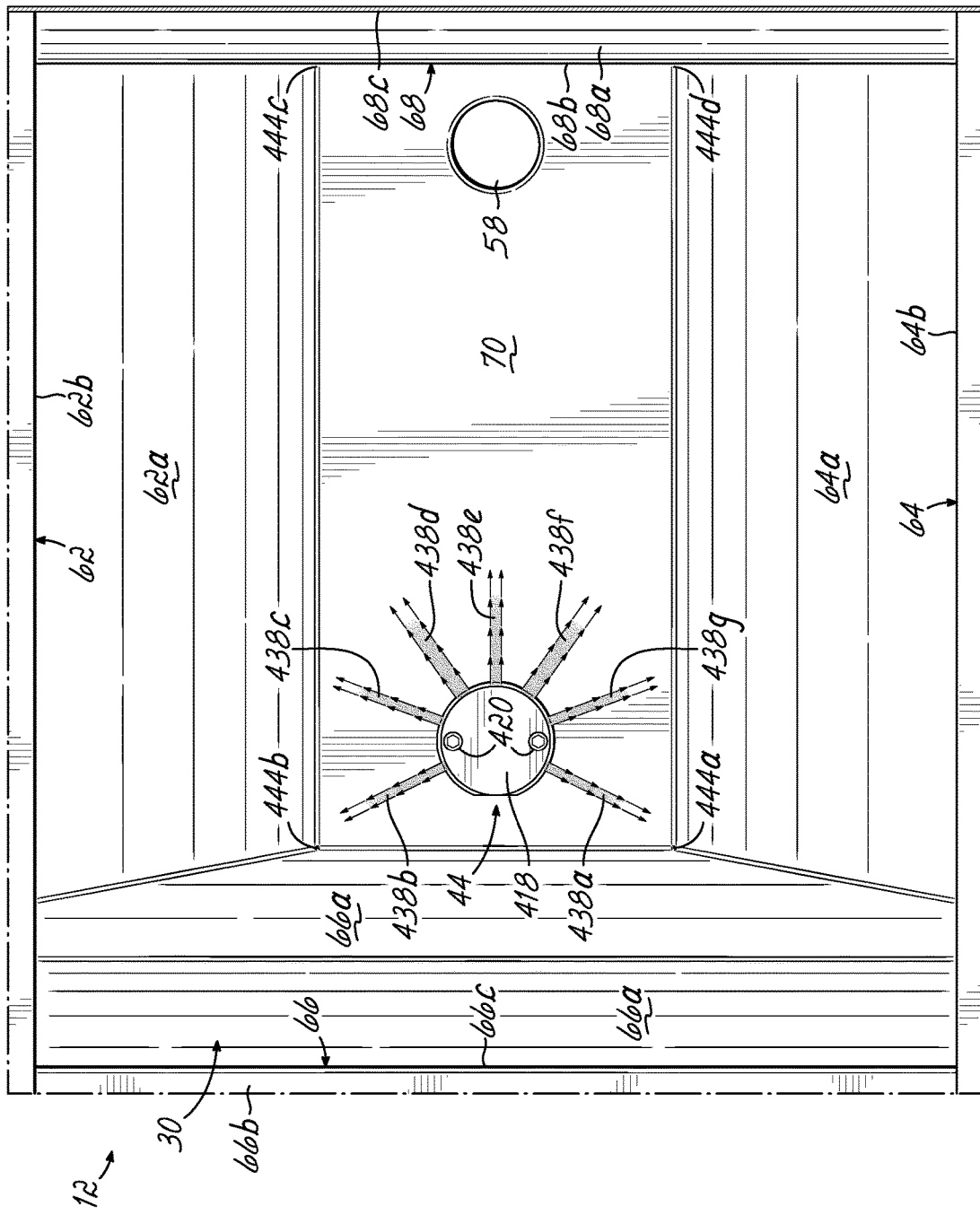
FIG. 12B is a top view of a full cooking chamber illustrating the spatial relationship between the spray jet nozzles directing the pressurized streams of FIG. 12A and the drain of the full cooking chamber.

As shown in FIGS. 12A and 12B, the spray jet nozzles 424a-g are separated at predetermined angles A1-A7 relative to one another around a periphery 426 of the upper portion 416 of the washing element 44 to orient the spray jet nozzles 424a-g so as to spray pressurized streams 438a-g of the cooking medium 42 to predetermined areas of the cooking chamber 12. The predetermined areas may include corners 444a-d of the cooking chamber 12 adjacent the bottom wall 70 and along the bottom wall 70 towards the first and second end walls 66, 68. As shown in FIG. 12B, the first and second spray jet nozzles 424a-b are directed towards the first end wall 66, while the third, fourth, fifth, sixth and seventh spray jet nozzles 424c-g are directed towards the second end wall 68.

With continued reference to FIG. 12B, the first spray jet nozzle 424a is directed to a first corner 444a between the bottom wall 70, the front end wall 66, and the second side wall 64. The second spray jet nozzle 424b is directed to a second corner 444b between the bottom wall 70, the front end wall 66, and the first side wall 62. The third spray jet nozzle is 424c is directed to the first side wall 62. The fourth spray jet nozzle 424d is directed to a third corner 444c between the bottom wall 70, the second end wall 68, and the first side wall 62. The fifth spray jet nozzle 424e is directed along the center of the bottom wall 70 towards the second end wall 68 to push crumbs towards the drain 58. The sixth spray jet nozzle 424f is directed to a fourth corner 444d between the bottom wall 70, the first end wall 66, and the second side wall 64. The seventh spray jet nozzle 424g is directed to the second side wall 64. The washing element 44 is positioned closer to the first end wall 66 than the second end wall 68, and is generally equidistant between the first and second side walls 62, 64.

With continued reference to the full cooking chamber 12 of FIG. 12B, the spray jet nozzles 424a-g are spaced at predetermined angles and have specific widths in the upper portion 416. As shown in FIG. 12B, the following angles are taken with respect to the center of the respective spray nozzles 424: A1 is about 126 degrees, A2 and A7 are about 47 degrees, and A3-A6 are about 35 degrees. Additionally, the first, second, third, and seventh spray jet nozzles 424a-c, 424g have widths W1-W3, W7 of about 0.15 inch, the fourth and sixth spray jet nozzles 424d, 424f have widths W4, W6 of about 0.25 inch, and the fifth spray jet nozzle 424e has a width of about 0.18 inch. Also, the widths W1-2 of the first and spray jet nozzles 424a-b may be of a reduced width or specific shape that is intended to clog first, should a clog occur. That would prevent higher pressure streams of cooking oil to be discharged towards the front end wall 66 when a clog occurs, which could otherwise lead to splashing oil in the direction where an operator would be standing during use of the fryer 10.

These values are exemplary, as the precise number of spray jet nozzles 424a-g may vary and a range of suitable angles may exist between the spray jet nozzles 424a-g, which may have a suitable width, depending on the areas which are difficult to clean and need to be reached by the cooking medium 42 flowing from the washing element 44. As such, persons skilled in the art would appreciate that the dimensions described herein with relation to the washing element 44 are with specific reference to the size and configuration of the particular cooking chamber 12 being used. For example, a split cooking chamber design differs from the full cooking chamber design described in this embodiment. Additionally, persons skilled in the art would appreciate that a cooking chamber with slightly different dimensions may have a slightly different washing element arrangement and respective angles. The distance and angles between the spray channel outlets 436a-g, the width and shape of each spray channel outlets 436a-g, the shape of upper portion 416, the height H, and other dimensions may be chosen based on where particles accumulate in the cooking chamber 12, i.e., the areas that are the most difficult to clean. To this end, the examples provided in these exemplary embodiments provide solutions tailored to the specific size and configuration of the cooking chambers shown in the Figures.

The washing element 44 provides many benefits regarding the operation of the fryer 10. For example, the washing element 44 effectively dislodges particles from the cooking chamber 12 and moves them towards the drain 58. This improves the ability of the fryer 10 to remove particles from the cooking chamber 12 in a quick and automated manner. This results in a minimal impact to the operation of the fryer 10, and frees up time to cook additional food products by reducing potential downtime for hand cleaning of the unit. Additionally, the washing element 44 is designed to control the flow direction of cooking medium 42 and provide the requisite velocity to remove particles and other debris from predetermined areas of the cooking chamber 12, specifically areas like corners where such particles and debris would tend to collect most readily. The velocity provided by narrow spray channel outlets 436a-g improves the removal of particles from the cooking chamber 12 when compared to traditional fryer washing systems and methods. As a result, manually washing the cooking chamber 12, while not entirely eliminated, is less frequently needed when compared to previous fryer washing systems and methods.

Figure 13:
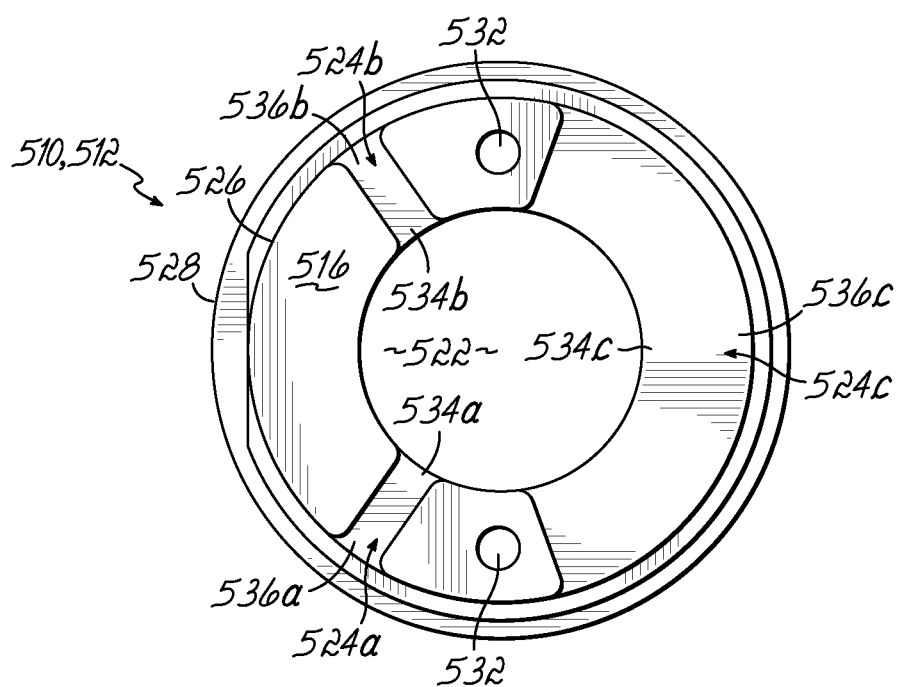
FIG. 13 is a top view of a washing element according to another exemplary embodiment.
Figure 13A:
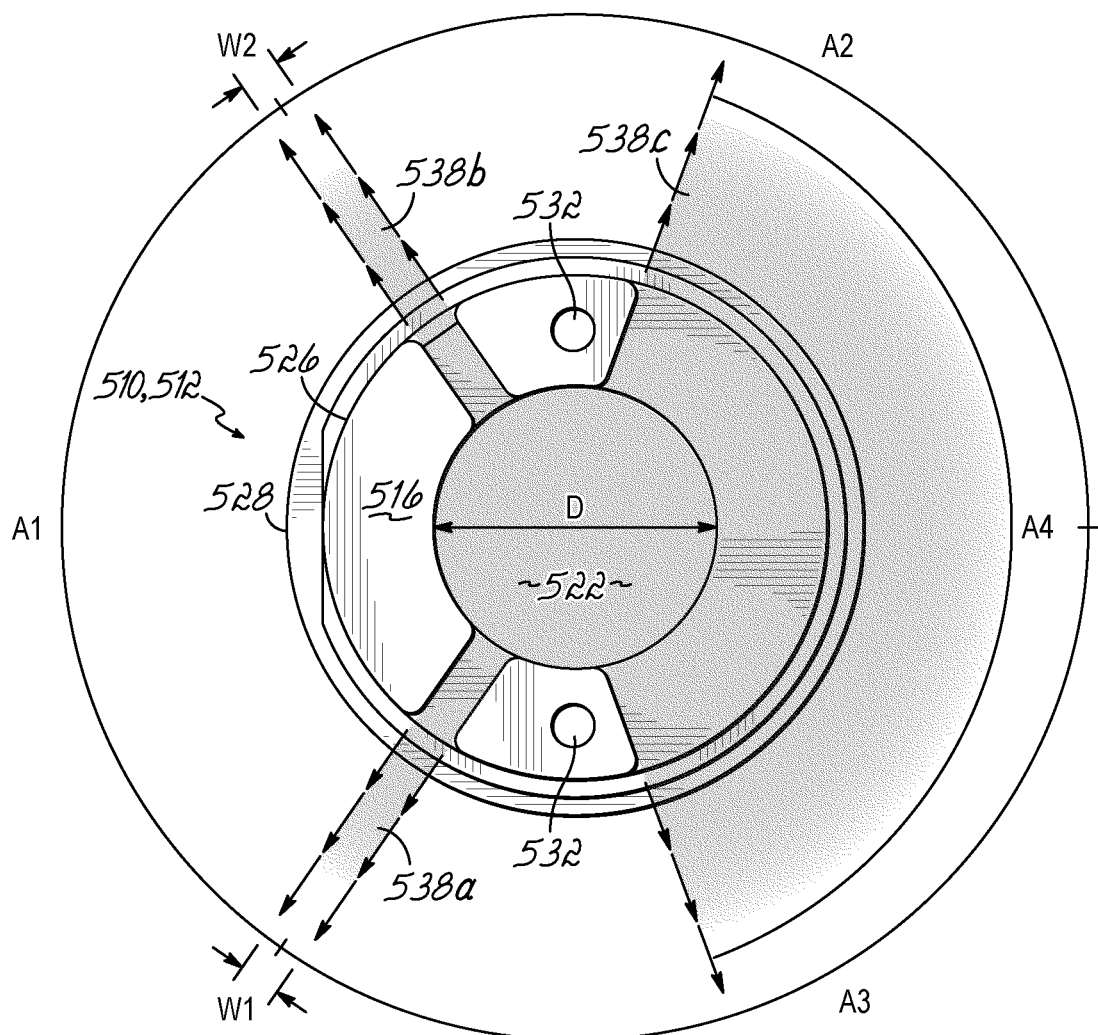
FIG. 13A is a top detailed view of the plurality of pressurized streams of cooking medium through the plurality of spray jet nozzles of the washing element of FIG. 13.
Figure 13B:
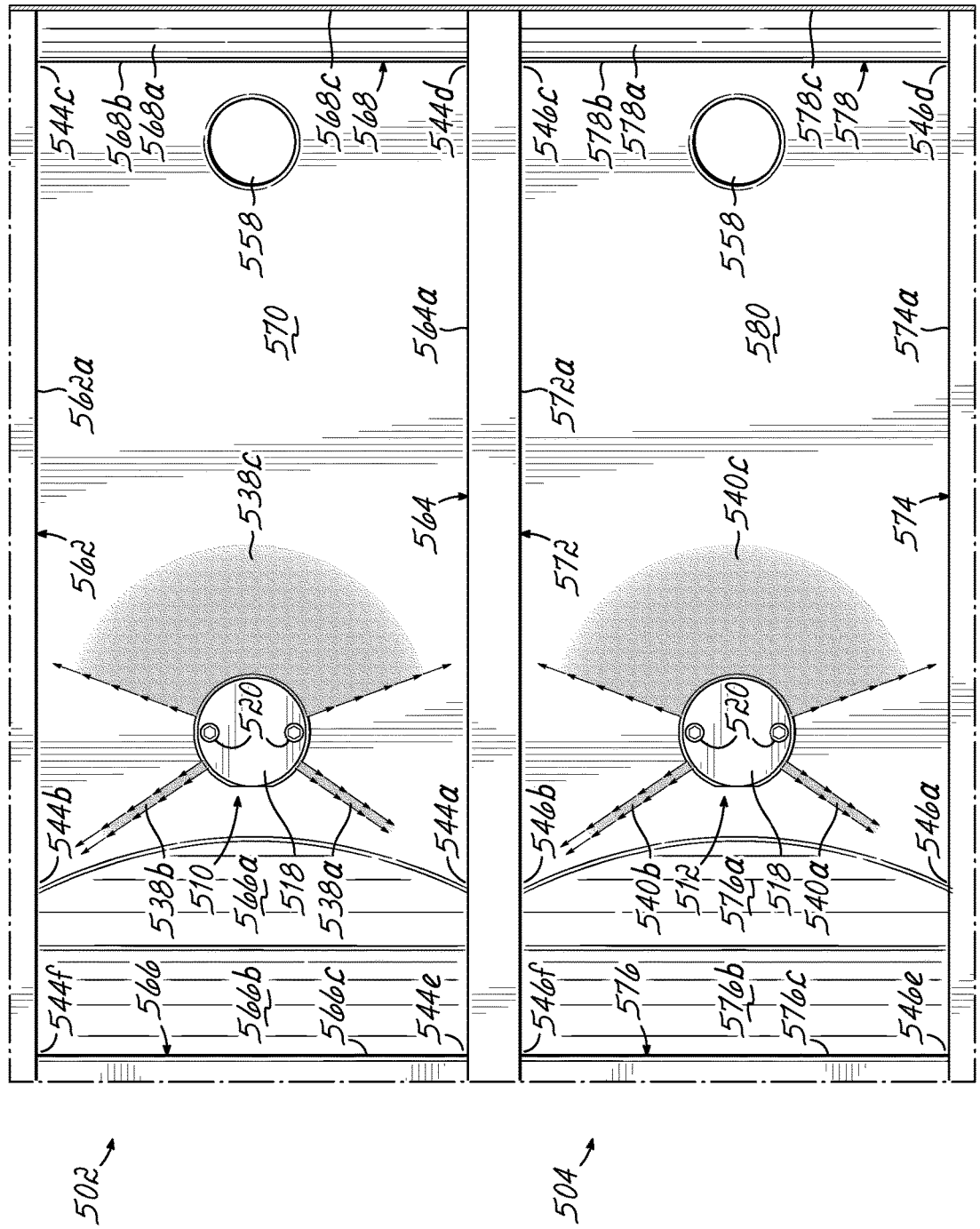
FIG. 13B is a top view of a split cooking chamber illustrating the spatial relationship between the spray jet nozzles directing the pressurized streams of FIG. 13A and the drains of the split cooking chamber.

Now with reference to FIGS. 13-13B, the first and second washing elements 510, 512 are shown in detail in accordance with another exemplary embodiment for a cooking chamber that is split into split cooking chambers 502, 504. The first and second washing elements 510, 512 include many of the same elements as the previously described embodiment (washing element 44), and these elements have been provided with similar reference numbers in the 500 series where the elements are substantially similar or identical. For example, each of the washing elements 510, 512 of this embodiment again includes an upper portion 516, cover 518, and fasteners 520, passage 522, first, second, and third spray jet nozzles 524a-c, lip 528, internal threads 532, first, second, and third spray channel inlets 534a-c, and first, second and third spray channel outlets 536a-c. Although many of these elements have slightly modified shapes or profiles in this embodiment, the washing elements 510, 512 and its elements function as described above except where the differences are outlined in further detail below (the detailed description of these identical or substantially similar elements is largely not repeated herein for the sake of brevity).

In this embodiment, the split cooking chamber 502 includes a plurality of side walls (including first and second side walls 562, 564 and first and second end walls 566, 568) connected to and extending upwardly from a bottom wall 570. The first and second side walls 562, 564, first and second end walls 566, 568, and the bottom wall 570 collectively surround an interior configured to receive a cooking medium 42. The split cooking chamber 504 includes a plurality of side walls (including first and second side walls 572, 574 and first and second end walls 576, 578) connected to and extending upwardly from a bottom wall 580. The first and second side walls 572, 574, first and second end walls 576, 578, and the bottom wall 580 collectively surround an interior configured to receive a cooking medium 42.

Persons skilled in the art would appreciate that the plurality of side walls may include more or less walls as desired, and the first and second side walls 572, 574, first and second end walls 576, 578, and the bottom wall 580 may include a plurality of wall sections (e.g. angled wall sections 566a-b, 568a, 576a-b, and 578a, and vertical wall sections 562a, 564a, 566c, 568b-c, 572a, 574a, 576c, and 578b-c) that collectively form each respective wall, allowing each respective wall to be curve, angled, or vertical, if desired.

In this embodiment, the first washing element 510 includes first, second and third pressurized streams 538a-c directed into the split cooking chamber 502, while the second washing element 512 includes first, second and third pressurized streams 540a-c directed into the split cooking chamber 504. The first, second and third spray channel outlets 536a-c of the first and second washing elements 510, 512 are configured to allow the first, second and third pressurized streams 538a-c, 540a-c of the cooking medium 42 to exit the washing elements 510, 512 towards predetermined areas of the split cooking chambers 502, 504, as will be described in greater detail with reference to FIG. 13B.

The spray jet nozzles 524a-g for the split cooking chambers 502, 504 are spaced at predetermined angles around the periphery 526 of the upper portion 516 and have specific widths in the upper portion 516. In the embodiment shown, the angles are taken with respect to center of the spray jet nozzles 524a-c. As shown in FIG. 13A, A1 is about 110 degrees and A2 and A3 are about 125 degrees of the circumference of the circular cross-section. The first and second spray jet nozzles 524a-b have widths W1-W2 of about 0.15 inch. These values are exemplary, as it is beneficial to balance the flow rate and the port sizing, as the number of spray jet nozzles 524a-c may vary and a range of suitable angles may exist between the spray jet nozzles 524a-c, which may have a suitable width, depending on the areas which are difficult to clean and need to be reached by cooking medium flowing from the first washing element 510. As shown, the widths W1-W2 of the first and second spray jet nozzles 524a-b may be of a reduced width or specific shape that will clog prior to the third spray jet nozzle 524c clogging, which is advantageous for the same reasons set forth above with respect to the embodiment in FIGS. 12-12B.

As shown in FIG. 13A, the size of the third spray channel outlet 536c is larger than the size of the third spray channel inlet 534c creating a broadcasting spray pattern (fan out pattern). Alternatively, while not shown, one or more of the spray jet nozzles 424a-g may have a focused spray pattern (fan in pattern), where the size of the spray channel outlet is smaller than the size of the spray channel inlet. As shown in FIG. 13B, the first and second spray jet nozzles 524a-b are directed towards the first end wall 566, 576 and have smaller spray channel outlets 536a-b than the third spray jet nozzle 524c directed generally along the length of the bottom wall 570, 580 and towards the second end wall 568, 578.

In this embodiment, with respect to the first washing element 510, the first spray jet nozzle 524a is directed to the first and fifth corners 544a, 544e between the bottom wall 570, the first end wall 566, and the second side wall 564. The second spray jet nozzle 524b is directed to the second and sixth corners 544b, 544f between the bottom wall 570, the first end wall 566, and the first side wall 562. The third spray jet nozzle 524c has an angle A4 about 140 degrees and broadcasts a large spray pattern across the bottom wall 570 of the split cooking chamber 502 and towards the third and fourth corners 544c, 544d. The larger broadcast spray pattern is configured to clean out those third and fourth corners 544c, 544d while also providing a primary large flow of oil along the length of the bottom wall 570 to move any particulate washed out of the corners and edges of the cooking chamber towards the corresponding drain port 558, and this ensures that the spray jet nozzles 524a-c are large enough to reduce the risk of clogging from particles (e.g. congealed oil/crumbs) while being able to direct the flow to predetermined areas ensuring the best wash performance.

With respect to the second washing element 512, the first spray jet nozzle 524a is directed to the first and fifth corners 546a, 546e between the bottom wall 570, the first end wall 566, and the second side wall 564. The second spray jet nozzle 524b is directed to the second and sixth corners 546b, 546f between the bottom wall 570, the first end wall 566, and the first side wall 562. The third spray jet nozzle 524c extends about 140 degrees and broadcasts a large spray pattern across the bottom wall 570 of the split cooking chamber 504 and towards the third and fourth corners 546c, 546d. The larger broadcast spray pattern is configured to clean out those third and fourth corners 546c, 546d while also providing a primary large flow of oil along the length of the bottom wall 580 to move any particulate washed out of the corners and edges of the cooking chamber towards the corresponding drain port 558. The corners 544a-d, 546a-d are defined along junctions of the bottom wall 570, 580 and the walls adjacent the bottom wall 570, 580.

Figure 14:
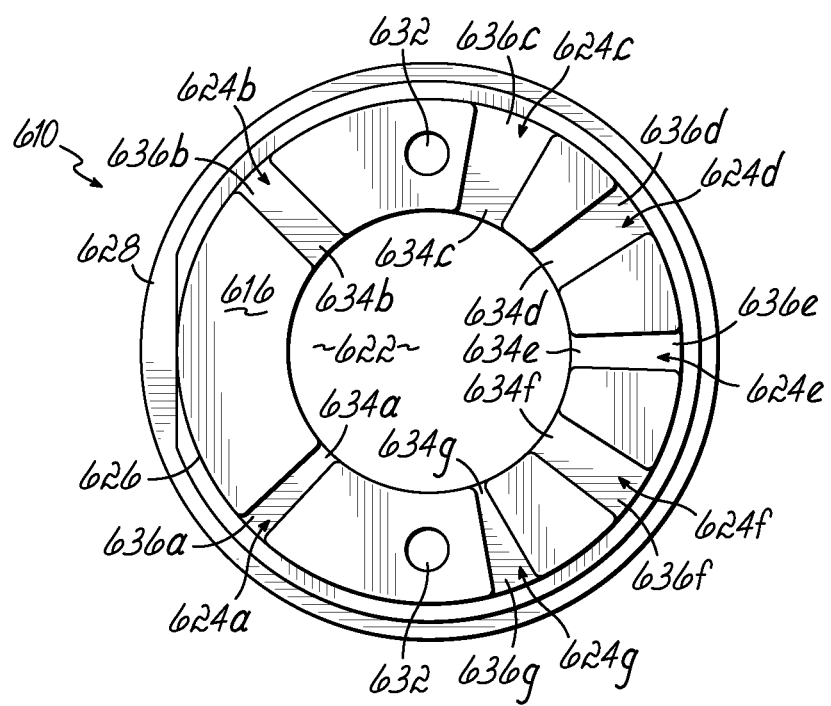
FIG. 14 is a top view of a washing element according to another exemplary embodiment.
Figure 14A:
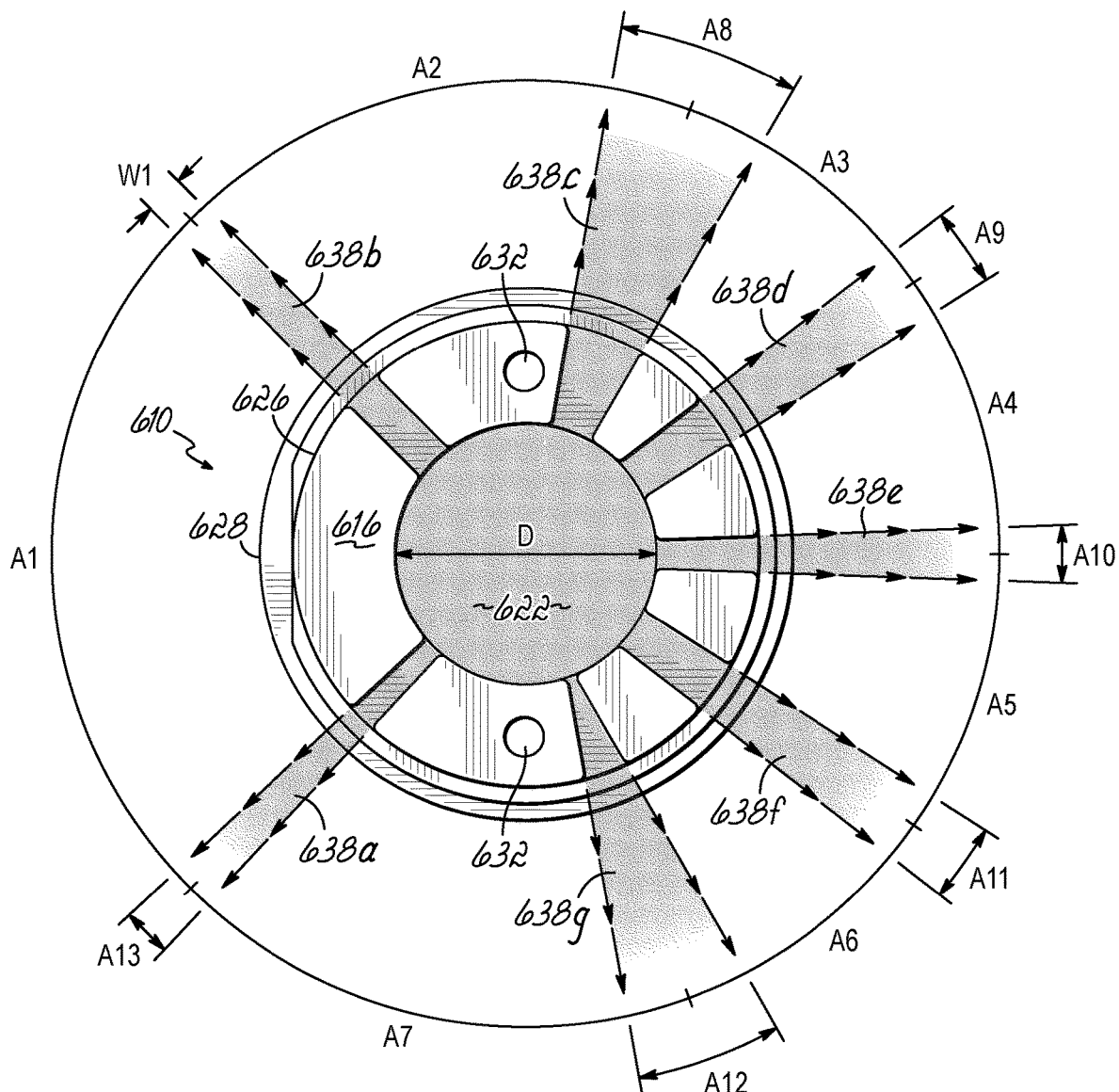
FIG. 14A is a top detailed view of the plurality of pressurized streams of cooking medium through the plurality of spray jet nozzles of the washing element of FIG. 14.

With reference to FIGS. 14 and 14A, a washing element 610 for a full-size cooking chamber 12, 14 is shown in detail in accordance with another exemplary embodiment. This washing element includes many of the same elements as the previously described embodiment (washing element 44), and these elements have been provided with similar reference numbers in the 600 series where the elements are substantially similar or identical. For example, the washing element 610 of this embodiment again includes upper portion 616, cover 618, fasteners 620, passage 622, first, second, third, fourth, fifth, sixth and seventh spray jet nozzles 624a-g, lip 628, internal threads 632, first, second, third, fourth, fifth, sixth and seventh spray channel inlets 634a-g, first, second, third, fourth, fifth, sixth and seventh spray channel outlets 636a-g, and first, second, third, fourth, fifth, sixth and seventh pressurized streams 638a-g.

In this embodiment, to wash debris from a full cooking chamber 12, spray jet nozzles 624a-g are be spaced at predetermined angles around the periphery 626 of the upper portion 616 and have specific widths in the upper portion 616. In the embodiment shown, the following angles are taken with respect to the center of the respective spray jet nozzles 624a-g: A1 is about 90 degrees, A2 and A7 are about 65 degrees, and A3-A6 are about 35 degrees. A8-A13 have divergent walls with diverging angles, for example, as shown, A8 and A12 are about 20 degrees, A9 and A11 are about 5 degrees, and A10 and A13 are about 4 degrees. The second spray jet nozzle 624b has a width W1 about 0.15 inch. These values are exemplary, as the number of spray jet nozzles 624a-g may vary and a range of suitable angles may exist between the spray jet nozzles 624a-g, which may have any suitable width, depending on the areas that are difficult to clean and need to be reached by the cooking medium 42 flowing from the washing element 610. As shown in FIG. 14A, the first and spray jet nozzles 624a-b may be reduced width or have specific shape to clog with particles first, which is advantageous for the same reasons set forth above for the embodiment shown in FIGS. 12-12B.

Figure 14B:
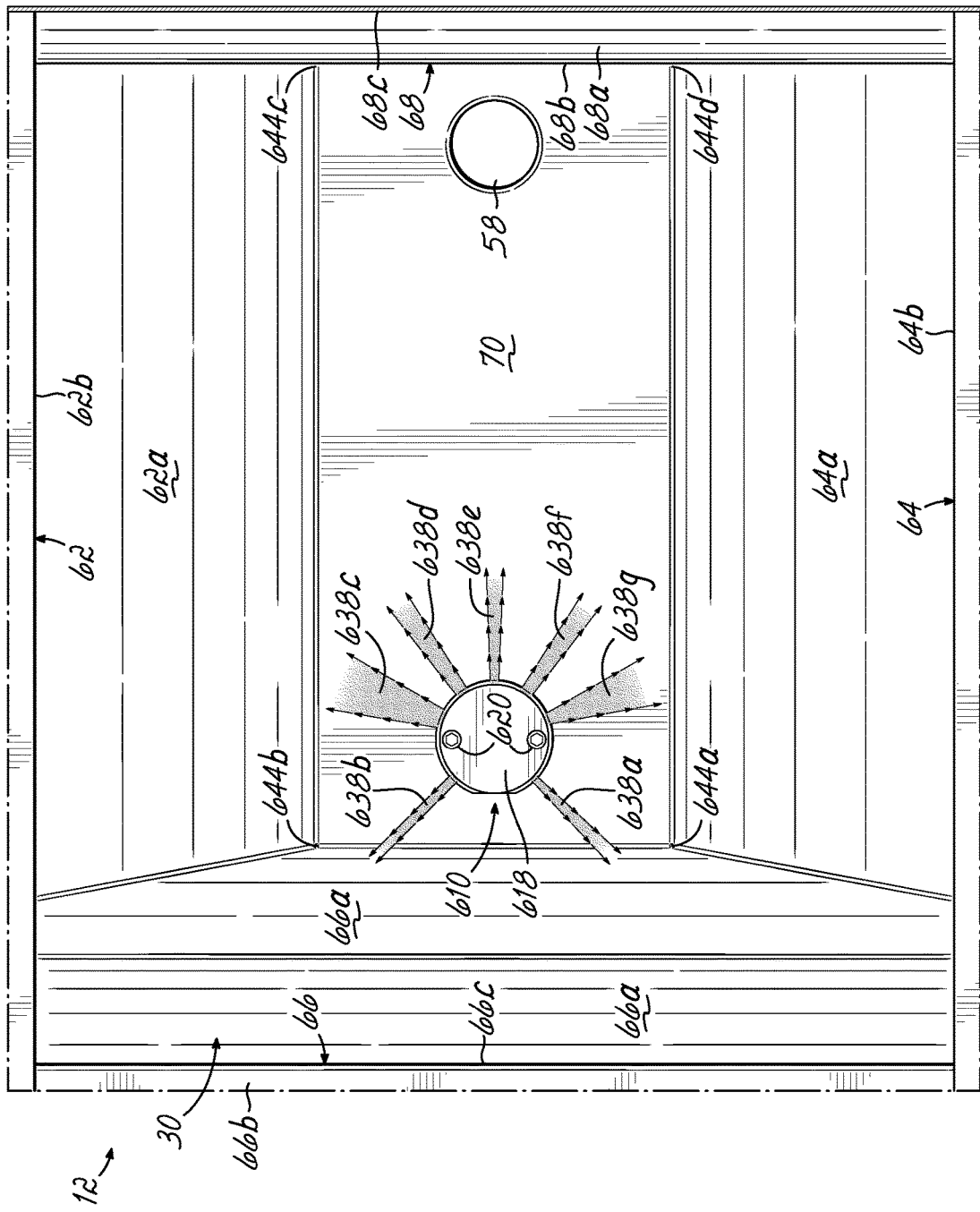
FIG. 14B is a top view of a full cooking chamber illustrating the spatial relationship between the spray jet nozzles directing the pressurized streams of FIG. 14A and the drain of the full cooking chamber.

Referring now to FIG. 14B, the first, second, fourth and sixth spray channel outlets 636a-b, 636d, 636g are directed to corners 644a-d of the cooking chamber 12. The corners 644a-d are defined along junctions of the bottom wall 70 and the plurality of side walls adjacent the bottom wall 70. Similar to the previous embodiment, the size of the third spray channel outlet 636c is greater than the size of either the first and the second spray channel outlets 636a-b. The third spray channel outlet 636c is directed along the bottom wall 70 towards the second end wall 68. As shown, the size of the first spray channel outlet 636a is smaller than the size of the second spray channel outlet 636b. To this end, it will be understood from this and the previous embodiments that each of the spray channel inlets and outlets can vary in size from one another depending on the particular needs when washing a particular geometry of cooking chamber.

Figure 16:
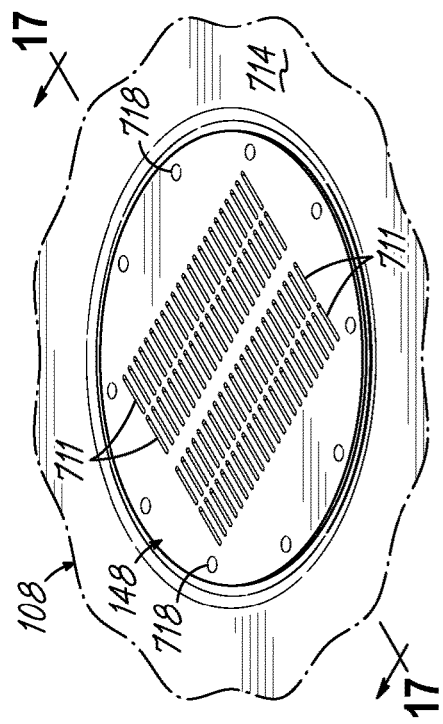
FIG. 16 is a detailed view of the filter screen of FIG. 15.
Figure 15:
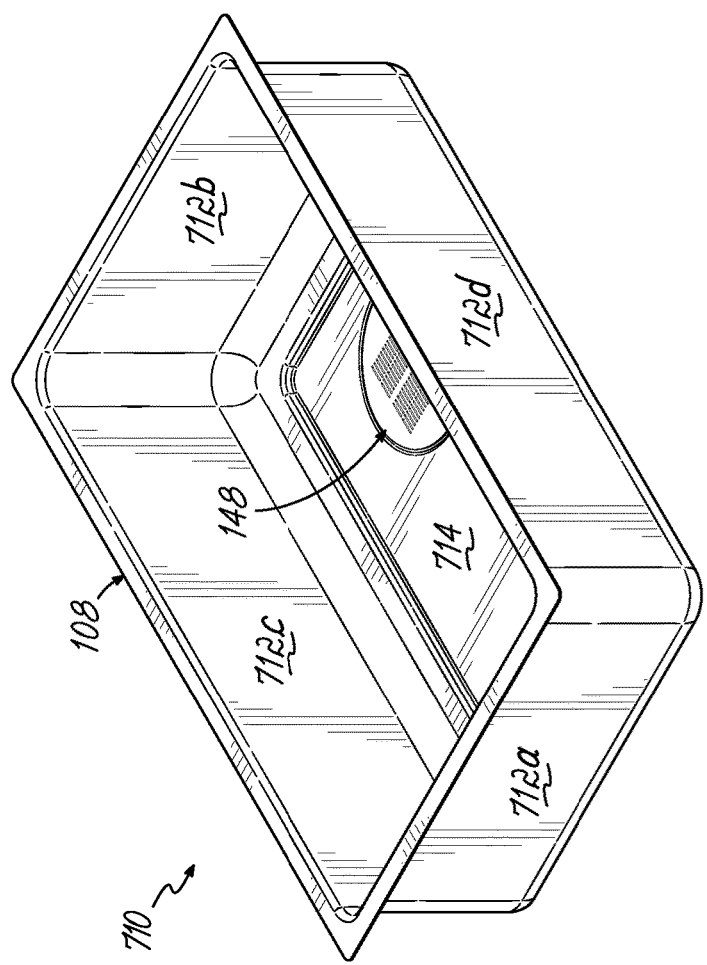
FIG. 15 is a perspective view of a drain pan including a filter screen permanently coupled to the drain pan.
Figure 17:
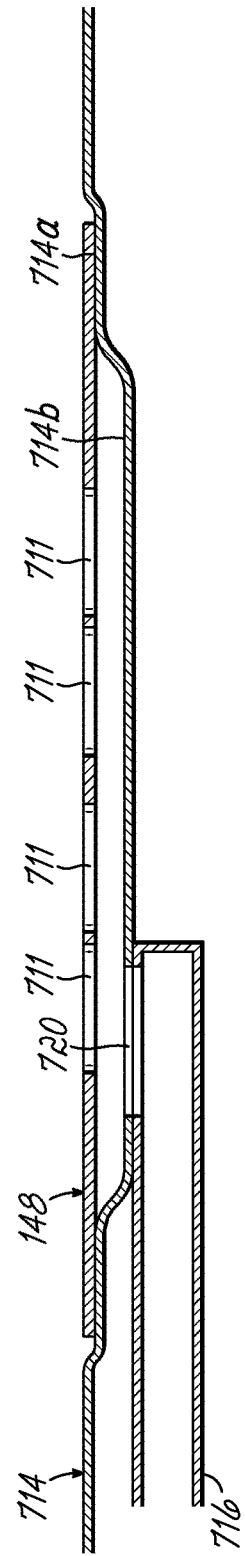
FIG. 17 is a cross-sectional view of the drain pan taken across line 17-17 of FIG. 16.

FIGS. 15-17 show a filtration system 710 including a filter screen 148 permanently coupled to the drain pan 108. The apertures 711 in the filter screen 148 are intended to clog first to provide an initial filtering to ensure that particles do not enter into downstream parts of the filtration system 710 (and/or the washing elements further downstream in the plumbing of the fryer 10). These particles may cause clogging of critical components of the fryer 10 (e.g. filter pump 112). The filter screen 148 is intended to clog first. As shown in FIG. 15, the drain pan 108 includes a plurality of side walls 712a-d and bottom wall 714 collectively surrounding an interior configured to receive a cooking medium 42. The bottom wall 714 may have depressed surfaces 714a-b and may be fluidically coupled to an outlet port 716 with an aperture 720. The filter screen 148 may be permanently attached to drain pan 108 to prevent the filter screen 148 from being inadvertently omitted from the fryer 10. For example, the filter screen 148 may be rigidly joined to the drain pan 108 using one or more welds 718 (e.g. spot welds). Additionally, permanently mounting the filter screen 148 to the drain pan 108 eliminates the risk of particles entering the filter assembly 110 during cleaning of the fryer 10.

A method of cleaning a fryer 10 is also described. The method uses the washing elements 44, 510, 610 coupled to the bottom walls 70, 570, 580 of cooking chambers 12, 14, 502, 504. The method includes spraying a plurality of pressurized streams 438a-g, 538a-c, 638a-g of a cooking medium 42 into predetermined areas of the cooking chamber 12, 14, 502, 504 of a fryer 10 using washing elements 44, 510, 610. The washing element 44, 510, 610 includes spray jet nozzles 424a-g, 524a-c, 624a-g that are separated at predetermined angles around an upper portion 416, 516, 616 of the washing element 44, 510, 610. The method may also include coupling a spreader bar 38, 40, 310 to an upper surface 204, 304 of a electric heating element 34, 301 to maintain a lower surface 206, 306 of the electric heating element 34, 301 at a predetermined distance away from the bottom wall 70, 570, 580 maximizing the effect of the washing element 44, 510, 610, wherein the spreader bar 38, 40, 310 maintains the electric heating coils 202, 302 shaped in a serpentine pattern.

In operation, the controller 48 of the fryer 10 may initiate filtering and a drain valve in the cooking chamber 12, 14 may be opened, causing the cooking medium 42 within the cooking chamber 12, 14, 502, 504 to flow through the drain port 58, 60, 558 of the cooking chamber 12, 14, 502, 504 and into drain pan 108. During the filtering process, the filtered cooking medium 42 may enter the cooking chamber 12, 14, 502, 504 through fill ports 54, 56 formed through a wall of the cooking chamber 12, 14, 502, 504. As the filtered cooking medium 42 enters the cooking chamber 12, 14, 502, 504, the washing element 44, 510, 610 effectively washes particles from at least one of the first and second side walls 62, 64, the first and second end walls 66, 68, and the bottom wall 70, 570, 580 of the cooking chamber 12, 14, 502, 504.

A maintenance filtering may be performed daily, or periodically at other time intervals (for example, intervals of greater than one day or less than one day) to clean the cooking chamber 12, 14, drain pan 108, or other components of the fryer 10. For example, the maintenance filtering may include a more thorough cleaning of the cooking chamber 12, 14, 502, 504, which may include scraping accumulation of particles from the walls of the cooking chamber 12, 14, 502, 504, brushing particles from crevices and cavities of the cooking chamber 12, 14, 502, 504, and soaking the cooking chamber 12, 14, 502, 504 with a cleaning solution (for example, a detergent, a slightly high pH cleaning solution, or the like).

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, actions, steps, operations, elements, and/or components, but do not preclude the presence or addition of one or more other features, integers, actions, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A fryer comprising:
   a cooking chamber including a plurality of side walls connected to and extending upwardly from a bottom wall, the plurality of side walls and the bottom wall collectively surrounding an interior configured to receive a cooking medium; and
   a washing element coupled to the bottom wall of the cooking chamber, the washing element comprising:
       a lower portion including a passage that is fluidically coupled to a fill port and configured to receive the cooking medium;
       an upper portion extending above the bottom wall of the cooking chamber and including a plurality of spray jet nozzles fluidically coupled to the passage, the plurality of spray jet nozzles being separated at predetermined angles relative to one another around a periphery of the upper portion of the washing element to orient the plurality of spray jet nozzles so as to spray a plurality of pressurized streams of the cooking medium to predetermined areas of the cooking chamber, the predetermined areas including at least one corner of the cooking chamber; and
       a cover coupled to the upper portion, the cover directing the cooking medium into the plurality of spray jet nozzles, wherein the cover is removably coupled to the upper portion of the washing element using at least one fastener,
   wherein the plurality of side walls includes first and second end walls, and
   wherein the spray jet nozzles directed towards the first end wall have smaller spray channel outlet than a remainder of the plurality of spray jet nozzles.

2. The fryer of claim 1, wherein the predetermined areas include each corner of the cooking chamber and along the bottom wall towards at least one end wall of the plurality of side walls, the corners being defined along junctions of the bottom wall and the plurality of side walls adjacent the bottom wall.

3. The fryer of claim 1,
   wherein the plurality of side walls includes first and second side walls and first and second end walls, and wherein the washing element is located generally equidistant between the first and second side walls of the cooking chamber.

4. The fryer of claim 1, wherein each of the plurality of spray jet nozzles further comprise:
a spray channel inlet fluidically coupled to the passage; and
a spray channel outlet fluidically coupled to the spray channel inlet and configured to allow the corresponding pressurized stream of the cooking medium to exit the washing element,
wherein for at least one of the plurality of spray jet nozzles, a size of the spray channel outlet is larger than a size of the spray channel inlet creating a broadcasting spray pattern.

5. The fryer of claim 1,
wherein the upper portion of the washing element has a circular cross-section, and
wherein one of the plurality of spray jet nozzles has an spray channel outlet having an angle that exceeds 120 degrees of a circumference defined by the periphery of the circular cross-section.

6. The fryer of claim 1, wherein the upper portion of the washing element extends above the bottom wall of the cooking chamber by about 0.125 inches.

7. The fryer of claim 1, further comprising:
an electric heating element disposed within the interior of the cooking chamber, wherein the electric heating element includes an electric heating coil arranged in a serpentine pattern, the electric heating coil including upper and lower surfaces; and
a spreader bar coupled to the upper surface of the electric heating coil that maintains the electric heating coil in the serpentine pattern,
wherein the positioning of the spreader bar also allows the electric heating coil to be spaced at a predetermined distance away from the bottom wall to provide additional clearance for the plurality of spray jet nozzles to direct the plurality of pressurized streams of the cooking medium between the bottom wall of the cooking chamber and the lower surface of the electric heating coil.

8. The fryer of claim 1, further comprising:
a drain port;
a drain pan configured to receive the cooking medium from the cooking chamber;
a filter screen permanently coupled to the drain pan; and
a filter pump fluidically coupling the drain pan to the fill port of the fryer.

9. A fryer comprising:
a cooking chamber including a plurality of side walls connected to and extending upwardly from a bottom wall, the plurality of side walls and the bottom wall collectively surrounding an interior configured to receive a cooking medium; and
a washing element coupled to the bottom wall of the cooking chamber, the washing element comprising:
a lower portion including a passage that is fluidically coupled to a fill port and configured to receive the cooking medium;
an upper portion extending above the bottom wall of the cooking chamber and including a plurality of spray jet nozzles fluidically coupled to the passage, the plurality of spray jet nozzles being separated at predetermined angles relative to one another around a periphery of the upper portion of the washing element to orient the plurality of spray jet nozzles so as to spray a plurality of pressurized streams of the cooking medium to predetermined areas of the cooking chamber, the predetermined areas including at least one corner of the cooking chamber; and
a cover coupled to the upper portion, the cover directing the cooking medium into the plurality of spray jet nozzles, wherein the cover is removably coupled to the upper portion of the washing element using at least one fastener,
wherein the plurality of side walls includes first and second end walls, and
wherein a number of spray jet nozzles directed towards the first end wall differs from a number of spray jet nozzles directed towards the second end wall.

10. The fryer of claim 9,
wherein there are at least two spray jet nozzles of the plurality of spray jet nozzles directed to the first end wall and there are at least five spray jet nozzles of the plurality of spray jet nozzles directed to the second end wall, and
wherein the first end wall is disposed at a distance closer to the washing element than the second end wall.

11. The fryer of claim 9,
wherein the plurality of spray jet nozzles includes at least a first spray jet nozzle with a first spray channel outlet and a second spray jet nozzle with a second spray channel outlet,
wherein both the first and second spray channel outlets are directed to either the first end wall or the second end wall, and
and wherein a size of the first spray channel outlet is greater than a size of the second spray channel outlet.

12. The fryer of claim 9, wherein the predetermined areas include each corner of the cooking chamber and along the bottom wall towards at least one end wall of the plurality of side walls, the corners being defined along junctions of the bottom wall and the plurality of side walls adjacent the bottom wall.

13. The fryer of claim 9,
wherein the plurality of side walls includes first and second side walls and first and second end walls, and
wherein the washing element is located generally equidistant between the first and second side walls of the cooking chamber.

14. The fryer of claim 9, wherein each of the plurality of spray jet nozzles further comprise:
a spray channel inlet fluidically coupled to the passage; and
a spray channel outlet fluidically coupled to the spray channel inlet and configured to allow the corresponding pressurized stream of the cooking medium to exit the washing element,
wherein for at least one of the plurality of spray jet nozzles, a size of the spray channel outlet is larger than a size of the spray channel inlet creating a broadcasting spray pattern.

15. The fryer of claim 9,
wherein the upper portion of the washing element has a circular cross-section, and
wherein one of the plurality of spray jet nozzles has an spray channel outlet having an angle that exceeds 120 degrees of a circumference defined by the periphery of the circular cross-section.

16. The fryer of claim 9, wherein the upper portion of the washing element extends above the bottom wall of the cooking chamber by about 0.125 inches.

17. The fryer of claim 9, further comprising:
an electric heating element disposed within the interior of the cooking chamber, wherein the electric heating element includes an electric heating coil arranged in a serpentine pattern, the electric heating coil including upper and lower surfaces; and
a spreader bar coupled to the upper surface of the electric heating coil that maintains the electric heating coil in the serpentine pattern,
wherein the positioning of the spreader bar also allows the electric heating coil to be spaced at a predetermined distance away from the bottom wall to provide additional clearance for the plurality of spray jet nozzles to direct the plurality of pressurized streams of the cooking medium between the bottom wall of the cooking chamber and the lower surface of the electric heating coil.

18. The fryer of claim 9, further comprising:
a drain port;
a drain pan configured to receive the cooking medium from the cooking chamber;
a filter screen permanently coupled to the drain pan; and
a filter pump fluidically coupling the drain pan to the fill port of the fryer.

19. A fryer comprising:
a cooking chamber including a plurality of side walls connected to and extending upwardly from a bottom wall, the plurality of side walls and the bottom wall collectively surrounding an interior configured to receive a cooking medium; and
a washing element coupled to the bottom wall of the cooking chamber, the washing element comprising:
  a lower portion including a passage that is fluidically coupled to a fill port and configured to receive the cooking medium;
  an upper portion extending above the bottom wall of the cooking chamber and including a plurality of spray jet nozzles fluidically coupled to the passage, the plurality of spray jet nozzles being separated at predetermined angles relative to one another around a periphery of the upper portion of the washing element to orient the plurality of spray jet nozzles so as to spray a plurality of pressurized streams of the cooking medium to predetermined areas of the cooking chamber, the predetermined areas including at least one corner of the cooking chamber; and
  a cover coupled to the upper portion, the cover directing the cooking medium into the plurality of spray jet nozzles, wherein the cover is removably coupled to the upper portion of the washing element using at least one fastener,
wherein the plurality of spray jet nozzles includes at least a first spray jet nozzle with a first spray channel outlet, a second spray jet nozzle with a second spray channel outlet, and a third spray jet nozzle with a third spray channel outlet,
wherein the first and second spray channel outlets are directed to corners of the cooking chamber, the corners being defined along junctions of the bottom wall and the plurality of side walls adjacent the bottom wall, and
wherein a size of the third spray channel outlet is greater than a size of either the first and the second spray channel outlets, the third spray channel outlet being directed along the bottom wall towards at least a first end wall or a second end wall of the plurality of side walls.

20. The fryer of claim 19, wherein the predetermined areas include each corner of the cooking chamber and along the bottom wall towards at least one end wall of the plurality of side walls, the corners being defined along junctions of the bottom wall and the plurality of side walls adjacent the bottom wall.

21. The fryer of claim 19,
wherein the plurality of side walls includes first and second side walls and first and second end walls, and
wherein the washing element is located generally equidistant between the first and second side walls of the cooking chamber.

22. The fryer of claim 19, wherein each of the plurality of spray jet nozzles further comprise:
a spray channel inlet fluidically coupled to the passage; and
a spray channel outlet fluidically coupled to the spray channel inlet and configured to allow the corresponding pressurized stream of the cooking medium to exit the washing element,
wherein for at least one of the plurality of spray jet nozzles, a size of the spray channel outlet is larger than a size of the spray channel inlet creating a broadcasting spray pattern.

23. The fryer of claim 19,
wherein the upper portion of the washing element has a circular cross-section, and
wherein one of the plurality of spray jet nozzles has an spray channel outlet having an angle that exceeds 120 degrees of a circumference defined by the periphery of the circular cross-section.

24. The fryer of claim 19, wherein the upper portion of the washing element extends above the bottom wall of the cooking chamber by about 0.125 inches.

25. The fryer of claim 19, further comprising:
an electric heating element disposed within the interior of the cooking chamber, wherein the electric heating element includes an electric heating coil arranged in a serpentine pattern, the electric heating coil including upper and lower surfaces; and
a spreader bar coupled to the upper surface of the electric heating coil that maintains the electric heating coil in the serpentine pattern,
wherein the positioning of the spreader bar also allows the electric heating coil to be spaced at a predetermined distance away from the bottom wall to provide additional clearance for the plurality of spray jet nozzles to direct the plurality of pressurized streams of the cooking medium between the bottom wall of the cooking chamber and the lower surface of the electric heating coil.

26. The fryer of claim 19, further comprising:
a drain port;
a drain pan configured to receive the cooking medium from the cooking chamber;
a filter screen permanently coupled to the drain pan; and
a filter pump fluidically coupling the drain pan to the fill port of the fryer.

* * * * *